United States Patent
Decker, Jr. et al.

(10) Patent No.: US 11,618,420 B2
(45) Date of Patent: Apr. 4, 2023

(54) UNDER-HOOD INSTALLED TOWED VEHICLE BRAKING SYSTEM

(71) Applicant: DANKO MANUFACTURING LLC, Castle Rock, CO (US)

(72) Inventors: Daniel L. Decker, Jr., Castle Rock, CO (US); Jerad M. Burkhart, Castle Rock, CO (US); Eric K. Becker, Sedalia, CO (US)

(73) Assignee: DANKO MANUFACTURING LLC, Castle Rock, CO (US)

( * ) Notice: Subject to any disclaimer, the term of this patent is extended or adjusted under 35 U.S.C. 154(b) by 478 days.

(21) Appl. No.: 16/904,043

(22) Filed: Jun. 17, 2020

(65) Prior Publication Data
US 2021/0394723 A1    Dec. 23, 2021

(51) Int. Cl.
*B60T 7/20*    (2006.01)
*B60T 17/22*   (2006.01)
*B60T 8/17*    (2006.01)
B60T 13/66    (2006.01)
B60T 13/74    (2006.01)

(52) U.S. Cl.
CPC .............. *B60T 7/20* (2013.01); *B60T 8/1708* (2013.01); *B60T 17/223* (2013.01); *B60T 13/662* (2013.01); *B60T 13/745* (2013.01)

(58) Field of Classification Search
CPC ........ B60T 7/20; B60T 8/1708; B60T 17/223; B60T 13/662; B60T 13/745
See application file for complete search history.

(56) References Cited

U.S. PATENT DOCUMENTS

| | | | |
|---|---|---|---|
| 3,897,979 A * | 8/1975 | Vangalis | B60T 8/1708 188/3 R |
| 5,503,468 A * | 4/1996 | Saffran | B60T 11/108 303/7 |
| 5,762,167 A | 6/1998 | Hendrix | |

(Continued)

OTHER PUBLICATIONS

Roadmaster, "Invisibrake Installation Instructions", Part No. 8700, 2011-2019 Roadmaster, Inc., 20 pgs.

(Continued)

*Primary Examiner* — Bradley T King
(74) *Attorney, Agent, or Firm* — Loza & Loza, LLP; Gordon R. Lindeen, III

(57) ABSTRACT

A towed vehicle braking system is described that in some embodiments includes a brake pedal connector configured to connect to a brake pedal of a towed vehicle brake in a passenger compartment of a towed vehicle, a power supply circuit in an engine compartment of the towed vehicle coupled to a towed vehicle battery to receive power, and a brake drive system in the engine compartment connected through a wall to the passenger compartment to the brake pedal connector to actuate the brake of the towed vehicle through the brake pedal connector by applying a positive pressure to the brake pedal connector to move the brake pedal. An inertial sensor in the engine compartment detects deceleration of the towed vehicle, and a processor in the engine compartment coupled to the inertial sensor and to the brake drive system causes the brake drive system to actuate the brake in response to the detection of deceleration.

20 Claims, 9 Drawing Sheets

(56) References Cited

U.S. PATENT DOCUMENTS

| | | | | |
|---|---|---|---|---|
| 5,785,393 | A * | 7/1998 | McGrath | B60T 15/14 |
| | | | | 303/181 |
| 5,915,798 | A * | 6/1999 | Ford | B60T 11/108 |
| | | | | 303/7 |
| 5,954,164 | A * | 9/1999 | Latham | B60T 17/223 |
| | | | | 303/7 |
| 6,152,544 | A * | 11/2000 | Greaves, Jr. | B60T 17/223 |
| | | | | 303/7 |
| 6,158,823 | A | 12/2000 | Schuck | |
| 6,557,948 | B2 | 5/2003 | Greaves | |
| 6,609,766 | B1 * | 8/2003 | Chesnut | B60T 11/107 |
| | | | | 188/3 R |
| 6,626,504 | B2 | 9/2003 | Harner et al. | |
| 6,644,761 | B2 | 11/2003 | Schuck | |
| 6,652,038 | B1 * | 11/2003 | Frye | B60T 7/20 |
| | | | | 303/7 |
| 6,802,572 | B2 | 10/2004 | Lamke et al. | |
| 6,874,602 | B2 | 4/2005 | Greaves, Jr. | |
| 7,699,406 | B1 | 4/2010 | Schuck, II | |
| 8,196,720 | B2 | 6/2012 | Deconti | |
| 8,430,458 | B2 | 4/2013 | Kaminski et al. | |
| 8,662,262 | B1 * | 3/2014 | Decker, Jr. | B60T 7/12 |
| | | | | 303/7 |
| 9,031,754 | B2 | 5/2015 | Matoy et al. | |
| 9,315,173 | B1 | 4/2016 | Gray et al. | |
| 9,399,448 | B1 | 7/2016 | Schuck | |
| 9,738,125 | B1 | 8/2017 | Brickley et al. | |
| 9,758,138 | B2 | 9/2017 | Albright et al. | |
| 10,040,037 | B2 | 8/2018 | Chen | |
| 10,850,715 | B1 * | 12/2020 | Decker, Jr. | B60T 8/1708 |
| 2002/0030405 | A1 * | 3/2002 | Harner | B60T 13/686 |
| | | | | 303/123 |
| 2004/0160117 | A1 * | 8/2004 | Brock | B60T 7/16 |
| | | | | 303/20 |
| 2004/0251094 | A1 * | 12/2004 | Cinquemani | B60T 7/20 |
| | | | | 188/110 |
| 2005/0093366 | A1 * | 5/2005 | Elstad | B60T 13/662 |
| | | | | 303/7 |
| 2008/0257656 | A1 | 10/2008 | Skinner et al. | |
| 2011/0087413 | A1 * | 4/2011 | McCrickard | B60T 7/20 |
| | | | | 188/112 R |
| 2013/0238205 | A1 | 9/2013 | Edwards et al. | |
| 2013/0325209 | A1 * | 12/2013 | Cooper | B60T 8/1708 |
| | | | | 701/2 |
| 2018/0148019 | A1 * | 5/2018 | Graham | B60T 7/107 |
| 2020/0172060 | A1 | 6/2020 | Decker, Jr. et al. | |
| 2021/0323519 | A1 * | 10/2021 | Robertson | B60T 7/20 |

OTHER PUBLICATIONS

VIP-Towbrake Instructions, 7-1-98 version, VIP Systems International, Ltd. 1998, 18 pgs.

* cited by examiner

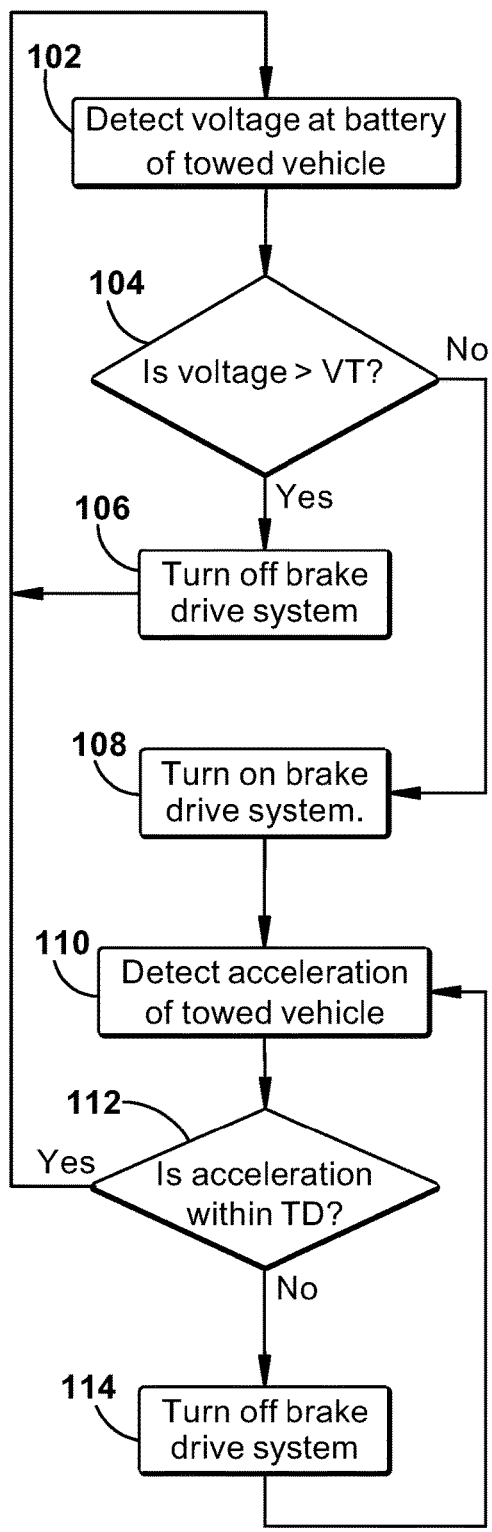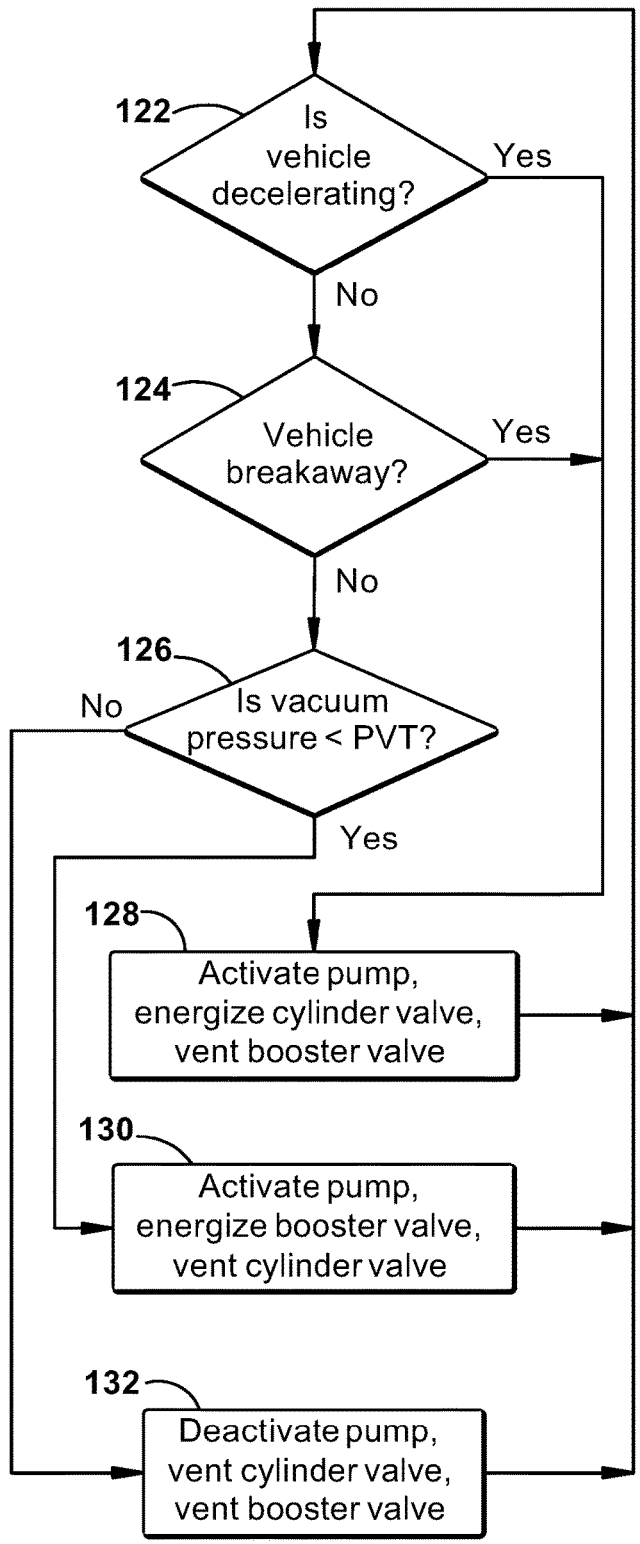
Fig. 10
Fig. 11

UNDER-HOOD INSTALLED TOWED VEHICLE BRAKING SYSTEM

FIELD

The present description relates to towed vehicle braking systems and, in particular, to a system that is installed into the towed vehicle.

BACKGROUND

It is often convenient to tow one vehicle behind another. A heavy trailer typically provides a separate electric or hydraulic braking system that can be controlled by the tow vehicle through a standardized interface. The trailer's brakes can significantly reduce the stopping distance of the combination by aiding the tow vehicle in stopping the combination. Unlike a trailer, a typical towed vehicle, such as an automobile, a car, or a truck, sometimes called a toad or a dinghy, does not have a trailer braking system interface. To reduce stopping distances, however, auxiliary braking systems have been developed to activate the towed vehicle's independent braking system. A particularly practical, convenient, and effective system rests on the floor of the vehicle cabin in front of the driver's seat and pushes the brake pedal in proportion to when and how the tow vehicle brakes.

The portable braking system that rests on the floor of the vehicle cabin does not require any modification to the vehicle and so it is easily moved to another vehicle. At the same time, it must also be disconnected and moved out of the way each time the vehicle is unhitched to be driven. It must then be stored out of the way to be re-installed for the next time it is towed. For this reason, many users choose a towed vehicle braking system that is permanently installed into the vehicle. With these systems, there is a cost to install the braking system and a further cost if it is ever moved to another vehicle. However, an installed system allows the driver to drive the vehicle with the installed braking system still in place.

BRIEF DESCRIPTION OF THE DRAWING FIGURES

The appended claims set forth the features of the invention with particularity. The present invention is illustrated by way of example, and not by way of limitation, in the figures of the accompanying drawings in which like reference numerals refer to similar elements.

FIG. 10 is a process flow diagram of controlling a brake drive system according to embodiments of the invention.

FIG. 11 is a process flow diagram of controlling an air pump and valves according to an embodiment of the invention.

DETAILED DESCRIPTION

Figure 1:
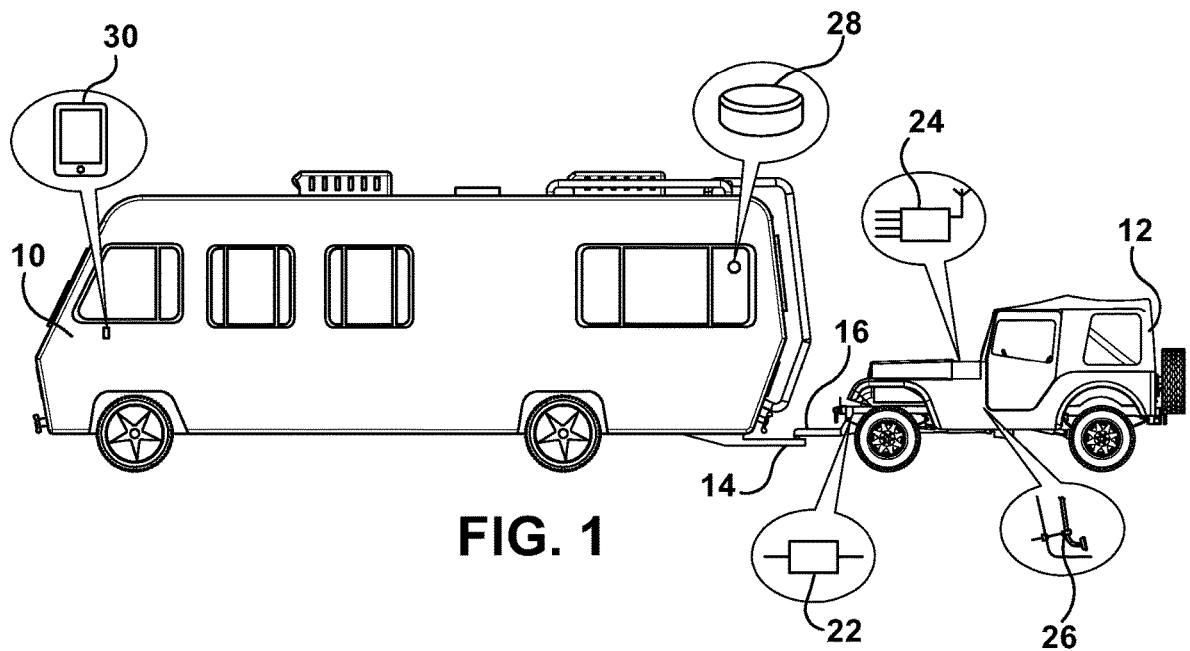
FIG. 1 is a diagram of one vehicle towing another using a towed vehicle braking system according to embodiments of the invention.

FIG. 1 is a diagram of a typical context in which a brake activation system such as described herein may be used. A tow vehicle 10 pulls a towed vehicle 12. In the illustration, the tow vehicle is a motor home and the towed vehicle is a light reconnaissance vehicle. However, the tow vehicle may be any type of car, truck, van, bus, or recreational vehicle and the towed vehicle may be any lighter vehicle that is towed flat on the ground and has a conventional brake system that is activated when a driver pushes a brake pedal. The tow vehicle has a tow hitch 14 and the towed vehicle has a tow bar 16. The tow bar attaches to the hitch for towing. When the towed vehicle is unhitched for separate use, the tow bar is removed or folded out of the way.

The towed vehicle 12 has a breakaway detector 22 near the towed vehicle front bumper or near the tow bar 16. The breakaway detector is connected with an electrical cable or wirelessly to a main controller 24 in this illustrated example. The breakaway detector alerts the main controller when there is a vehicle breakaway. In this example, the main controller is in a location under the hood. In some cases, the main controller may be located at a high position near the battery in a position better protected from the road and from engine heat. The main controller includes a brake pedal connector 26 with a cable or arm to pull the brake pedal of the towed vehicle. The main controller actuates the brake pedal in response to a vehicle breakaway and when the tow vehicle is braking.

The main controller also has a wireless interface to communicate with other parts of the system. In this example, the tow vehicle optionally has an access point or hub 28 at the rear of the tow vehicle near a wireless interface of the main controller 24. The tow vehicle also has a portable control panel 30 near the driver that is wirelessly coupled to the main controller directly or through the hub to display status information, such as braking activity, battery activity, or a breakaway alert. In some embodiments, the portable control panel shows other information from the main controller such as operational states, battery status, and inertial sensor measurements.

In some embodiments, other devices may be connected to the portable control panel. Tire pressure monitors may be attached to each tire to determine the pressure at any one or more tires on the tow and towed vehicles. In some embodiments, the tire pressure sensors are attached to tire valve stems, for example in the form of a valve cap, and include pressure sensors and wireless transmitters to send the sensed tire pressure to the main controller, the hub, or the portable control panel. These may transmit data for display on the portable control panel. In some embodiments, cameras may be placed on the towed vehicle or tow vehicle, such as backup, side view, and security cameras. These cameras may wirelessly connect to the portable control panel for control and display. In some embodiments, the portable control panel may be coupled to external information sources such as through the Internet directly, through the hub, or through a smartphone or mobile Internet device. This connection may be used to show weather conditions, travel information, and other information. In some embodiments, the portable control panel has position sensors or is connected to position sensors and shows mapping and navigation information.

The optional hub in this example provides a wireless link from equipment on the towed vehicle to the portable control panel. The hub may be a repeater, a wireless router, an access point, or part of a mesh network. The hub may be connected to an external network through an internal system or a connection to another wireless hot spot. The hub may be used to connect users inside the tow vehicle to external networking equipment outside the vehicle. As an example, some vehicles use a satellite ground station mounted on the vehicle for an Internet connection. In some embodiments, the hub is portable and may be removed from a power dock inside the tow vehicle and used in other locations for other purposes. In some embodiments the hub has level sensors and may be placed on the floor or another surface of the tow vehicle to determine whether the vehicle is level. This data is provided to the portable control panel. A user outside the tow vehicle may adjust attitude of the tow vehicle while referring to level information displayed on the portable control panel. The hub may similarly be used to level trailers or other vehicles and to measure pitch in different situations. In some embodiments, the hub transmits level information when mounted in the dock to the portable control panel. This may be used to provide roll, yaw, and pitch information to the driver or passenger while underway. The described vehicle combination and functions are provided as an example and there may be more or fewer components with wired or wireless connections.

Figure 2:
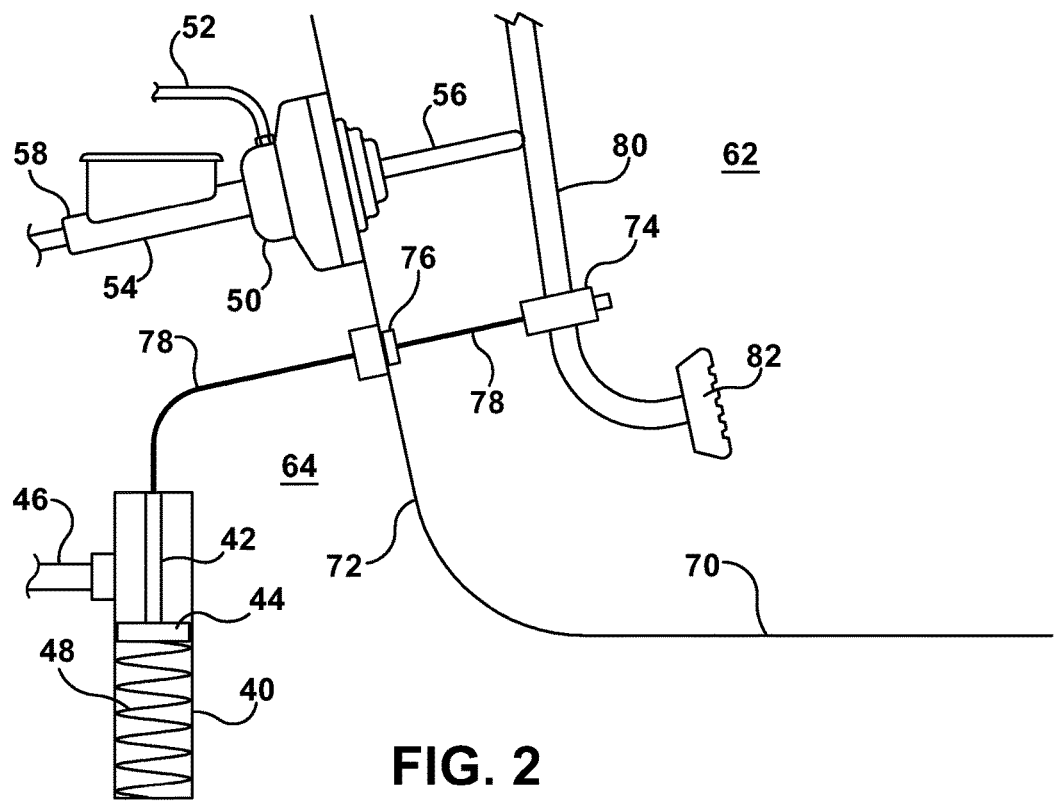
FIG. 2 is a diagram of a portion of an installed towed vehicle braking system and towed vehicle brakes according to embodiments of the invention.

FIG. 2 is a diagram of a portion of an installed towed vehicle braking system and towed vehicle brakes according to embodiments of the invention. The interior passenger compartment 62 of the towed vehicle is separated from the engine compartment 64 by a firewall 72 that becomes or is attached to the floor 70 of the driver's area of the towed vehicle passenger compartment. In the illustrated example, the towed vehicle interior floor pan 70 is typically, but not necessarily carpeted. The floor pan extends forwards to the firewall 72 between the passenger compartment and the engine compartment. The floor pan also extends rearwards in the opposite direction to a seat platform (not shown).

The vehicle interior also has a brake pedal 82 suspended from a brake pedal arm 80 used to activate the vehicle's independent braking system. When pressed, the brake pedal arm drives a rod 56 into a brake power booster 50. The power booster is coupled to a master cylinder 54 with a hydraulic reservoir so that when the brake pedal is pressed, brake fluid is pushed out of the reservoir through brake lines 58 to drive brake pads or shoes against rotors or drums to slow or stop the towed vehicle wheels. The power booster uses vacuum, typically, but not necessarily supplied by an engine intake manifold. The power booster increases the effect of the brake pedal against the master cylinder using the stored vacuum. The power booster reservoir has a vacuum supply line 52 that is connected to a vacuum source to maintain the vacuum reservoir of the power booster 50. When the engine is not running the vacuum reservoir of the power booster may be replenished by an air pump (not shown) of the brake drive system as described below. The illustrated configuration is provided as an example, the invention is not limited to any particular configuration or operation of the vehicle's braking system.

In FIG. 2, a clamp 74 is shown attached to the brake pedal arm 80. The clamp is also attached to a cable 78 including a conduit or a rod that extends through a conduit connector 76 at the firewall 72. The cable 78 extends through the firewall to the engine compartment and attaches to a brake pedal drive system. In this example, the brake pedal drive system includes a piston rod 42 in a cylinder 40. The piston rod is attached to a piston 44 that is driven through the cylinder to pull or release the cable 78. When actuated, the piston pulls the cable through the cable conduit through the firewall to the brake pedal arm to pull the brake pedal toward the firewall to engage the brakes of the towed vehicle. In other words, the piston applies a positive pressure to the brake pedal, through the brake pedal arm. This is the same positive pressure that would be applied by a driver with the foot to brake the vehicle.

When de-actuated, the cable tension is released and the brake pedal arm returns to its neutral position so that the towed vehicle brakes are released. The vehicle brake system has its own negative pressure that pushes against the positive pressure of the cable to stop or release the vehicle brakes. This inherent negative pressure of the vehicle brakes may be used to move the piston back to its initial position when the positive pressure, generated by the pneumatic system, is released. In addition, a spring 48 may be used that is attached to the piston to push the piston back to the neutral position at the end of each braking cycle. Alternatively, the piston may be driven by pneumatic pressure in the opposite direction to its initial position.

In some embodiments, the piston 44 of the brake drive system is driven by a pneumatic pressure supply line 46. Pneumatic pressure drives the piston away from the cable, drawing the cable away from the brake pedal arm toward the firewall actuating the brake. When the pneumatic pressure is released, then the piston is allowed to move through the cylinder back to release the pull on the brake pedal. Various additional valves and lines may be provided to control the action of the piston. Hydraulic pressure from a suitable pump and reservoir may be used instead of pneumatic pressure. Alternatively, other brake pedal drive systems may be used, such as linear motors, solenoids, electromagnetic drives, worm gear drives, stepper motors, driven cable reels, etc. An arm or rod may be used to drive the brake pedal arm instead of the illustrated cable. For the cable, additional components, such as guides, idlers, pulleys, tension wheels, etc. may be used to control and direct the cable. Similarly, for an arm or rod system, hinges, joints, cams, etc. may be used to direct and control the force on the brake pedal arm. In some embodiments, cables and rods may be combined to convert the action of the arm drive system to an appropriate force against the brake pedal arm.

The brake pedal arm clamp 74 may take different forms depending on the nature of the brake pedal arm. The clamp may have a front and rear plate attached on opposite sides of the brake pedal arm by screws or pivoting arms. The clamp may have a circular shape that is wrapped around the brake pedal arm and then tightened around the arm to remain in place. The clamp may have a pin that extends through the brake pedal arm to hold the clamp in place. The clamp is configured to prevent the cable from moving along the length of the brake pedal arm and also to allow the cable to pivot as the brake pedal moves. The clamp may be attached to the brake pedal arm, as shown, or to the brake pedal or in any other suitable location that provides sufficient leverage on the brake system without interfering with an operator driving the towed vehicle.

The system of FIG. 2 is provided as an example only. It may be modified in many different ways to suit different applications. More or fewer components may be used depending upon cost and accuracy constraints. In addition, additional components may be added to provide additional functions other than activating the braking system.

Figure 3:
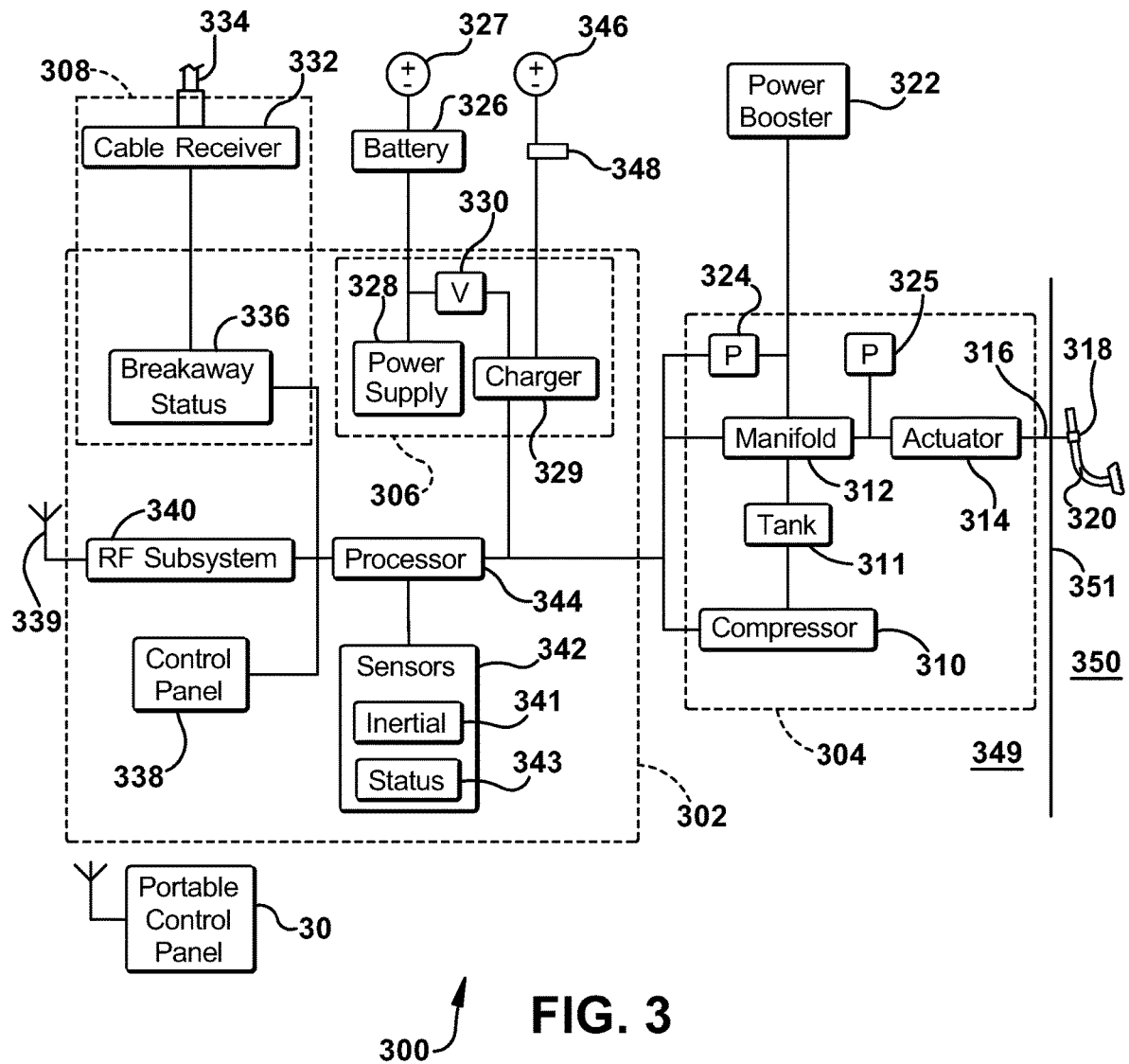
FIG. 3 is a block diagram of an installed towed vehicle braking system according to embodiments of the invention.

FIG. 3 is a block diagram of an example towed vehicle braking system 300 installed into a vehicle. The system may be configured to remain in the towed vehicle when the vehicle is being towed, driven, and stored. In this example, the entire system is operated and controlled by a central processor 344 of the main controller 302, typically in the form of a programmed microprocessor or microcontroller with embedded or discrete program instructions and operational memory. Any other programmable or hardcoded logic, such as Field Programmable Gate Arrays (FPGAs), TTL logic, or Application Specific Integrated Circuits (ASICs), may alternatively be used. Alternatively, there may be multiple independent subsystems for one or more of the particular functions described herein. The central processor is coupled to at least a brake pedal drive system 304 and actuates the brake pedal based on input from an inertial sensor module 342 and a breakaway module 308. In this example, the brake pedal drive system includes an air pump or air compressor 310, a brake actuator 314 in the form of a pneumatic cylinder and piston, a cable 316 from the piston to the brake pedal arm 320, and a manifold 312, that includes a valve array to control the operation of the piston 314. The compressor 310 may be pneumatically coupled to the manifold 312 through an optional tank 311 or through a pressure reservoir.

The tank may be used to provide a reservoir of pneumatic pressure for immediate use. The tank allows for a smaller compressor. The compressor provides pneumatic pressure through hoses or pipes to the manifold 312. The manifold has a valve array operated by solenoids or other actuators that are controlled directly by the central processor 344 or by a subsidiary brake drive system controller (not shown). The manifold 312 is coupled to the brake actuator 314 with further hoses or pipes and distributes the pneumatic pressure to the actuator 314 under the control of the central processor 344. The air pump or air compressor 310 may come in many different forms and sized to suit different vehicles and different actuators. The primary function is to pump air from the power booster and to the actuator. To simplify reading, it will be referred to as an air pump herein but the term air pump should be construed to mean any suitable compressor or other air handler capable of operating as shown and described.

The actuator 314 drives a cable 316 in response to the distributed pneumatic pressure. The cable extends through the towed vehicle firewall 351 and is attached with a clamp 318 to the towed vehicle brake pedal arm or another suitable structure. The cable moves the towed vehicle brake pedal through a brake pedal arm 320 or any other means to engage and release the towed vehicle brakes. As shown, the brake pedal arm 320 and cable clamp 318 are on one side of the firewall 351 in the vehicle passenger compartment 350. The other components, including the actuator 314 are on the other side of the firewall 351 in the vehicle engine compartment 349. This configuration minimizes the braking system's 300 intrusion into the passenger compartment. As mentioned, some of the components may be installed inside the passenger compartment and additional guides, idlers, or hinges may be installed to improve the operation of the brake pedal arm. While the braking system 300 is illustrated as a pneumatic system, any other suitable type of brake pedal drive system 314 may be used under control of the central processor 344. The compressor and manifold may be replaced by other systems or power supplies for an electric system or removed in favor of a worm gear drive or other actuator.

The manifold 312 has a further optional pneumatic connection to an optional vehicle brake power booster 322. While many vehicles have a vacuum driven brake power booster, some have no brake power booster and others have electric brakes. In this example, the power booster receives the movement of the brake pedal arm through a connection as shown in FIG. 2 and increases the hydraulic pressure applied to the brakes of the towed vehicle. The power booster uses an internal vacuum reservoir that is consumed when the towed vehicle brakes are engaged. The vacuum reservoir is connected to the engine air intake manifold by a hose. The engine creates vacuum at the intake when the towed vehicle is running. The hose maintains the same vacuum at the engine as at the reservoir to replenish the power booster.

However, when the towed vehicle is being towed, the engine is typically not running and is not able to replenish the vacuum reservoir. In some embodiments, a tee fitting in the power booster hose (not shown) between the power booster and the engine allows a vacuum supply line to be connected from the manifold 312 to the power booster. A vacuum sensor 324 is coupled to the vacuum reservoir through the vacuum supply line or in some other suitable location to measure the vacuum pressure in the reservoir. The brake drive system manifold 312 provides vacuum from the compressor 310 to the power booster in response to the vacuum sensor. In some embodiments, the vacuum sensor is coupled to the central processor 344 and the central processor commands the compressor and manifold to energize to replenish the power booster as needed. An additional pressure sensor is coupled between the manifold and the brake drive piston 314 to measure the pneumatic pressure at the cylinder. Additional sensors may be used to suit particular implementations.

The central processor is also coupled to a sensor module 342. The sensor array contains two types of sensors. A first type of sensor 341 determines whether the tow vehicle is braking, and if so, then how firmly. In one example, the sensor receives commands from a trailer wiring system of the tow vehicle (not shown). In another example, the sensor array includes inertial sensors such as accelerometers, pitch sensors, pressure sensors, or other sensors to determine whether the tow vehicle is braking. When the sensors determine that the tow vehicle is braking and this information is sent to the central processor, then the central processor can activate the brakes of the towed vehicle through the actuator 314 of the brake pedal drive system 304 to assist the tow vehicle brakes. The amount of braking or the firmness of the braking can also be determined using the inertial sensors. In this way, if the tow vehicle is braking firmly, then the towed vehicle's brakes will be operated firmly. On the other hand, if the tow vehicle is braking gently then the towed vehicle's brakes may also be operated gently.

A second type of sensor 343 of the sensor module 342 determines the operational conditions of the braking system 300. For example, sensors may measure the pressure in the power booster 322 and the pressure tank 311, the condition of the compressor 310, the positions of the valves in the manifold 312, the position of the piston arm 42, and other conditions. This information may be used to ensure that the system operates as intended. There may also be sensors to determine that the brake cable 316 is properly attached, that power is being supplied to the system and other braking system parameters.

The central processor 344 is also coupled to a fixed control panel 338 that includes a user interface to receive commands and to provide information to the user. The control panel 338 may be in the form of buttons, knobs, and lights or a touchscreen or some combination to indicate status and operation conditions. There may be switches or other suitable command interfaces for power condition, operational mode, sensor status, and any other suitable information and control. A user may be able to operate and test the braking system at the control panel.

An RF (Radio Frequency) subsystem 340 is coupled to the central processor and provides wireless connectivity and a wireless interface to other components of the system. The RF subsystem includes an RF I/O (Input/Output) port that is coupled through analog RF FE (Front-End) circuitry to an antenna 339. The subsystem 340 may use Wi-Fi, Wi-Fi Direct, 5G, Bluetooth, or any other wireless protocol on any suitable frequency, including unlicensed bands. The transceiver can include modulators, up-converters, frequency generators, mixers, multiplexers, analog amplifiers and similar components.

The RF subsystem may communicate with the portable control panel 30 with or without an intermediate hub 28 and to other components as described herein. The portable control panel, and any other connected wireless terminals such as a smart phone, mobile, device, personal computer, or tablet, may be used instead of or in addition to the fixed control panel 338. In one example, the RF subsystem including the RF I/O and RF FE receives commands and sends status messages to the portable control panel 30 in the tow vehicle. The portable control panel provides status and control that the tow vehicle driver can see and operate from the driver's seat of the tow vehicle or any other location that is within range. Upon arrival at a destination, the portable control panel may be used for other purposes. The two-way connection may be used to facilitate a variety of different purposes and the portable control panel may also be used in the towed vehicle for set up, diagnosis, and operation. In particular, if the brake sensor or any other sensor detects a fault, then the RF subsystem may send an alert to the portable control panel 30 in the tow vehicle and also activate any other alarms or alerts, such as on the fixed control panel 338 or using audible warnings.

The RF subsystem 340 may also communicate with additional sensors at the hitch, in the towed vehicle, or in the tow vehicle to obtain additional sensor and brake activation information. The RF subsystem may also contain receivers for position information to send position data and an alert if the towed vehicle is lost or stolen.

The braking system 300 further optionally includes a breakaway system 308. A cable 334 is attached to the tow vehicle (not shown) at one end and attached to a breakaway cable receiver 332 at the other end. The breakaway cable receiver detects when the cable is removed, indicating that the towed vehicle is no longer connected to the tow vehicle. Any of a variety of other proximity sensors may be used instead or in addition. The breakaway status of the tow vehicle, for example the presence of the cable, is indicated by the receiver 332 to a status detector 336. The breakaway cable receiver 332 may be connected to the breakaway status detector 336 by a physical wired or optical bus interface or by a radio connection either directly between the breakaway cable receiver 332 and the breakaway status detector 336 or through the RF subsystem 340. In one example, the breakaway cable receiver is mounted near or on the tow bar of the towed vehicle and the breakaway status detector is a part of the braking system main controller 302.

The braking system further optionally includes a towed vehicle power control system 306. A power supply circuit 328 is coupled to the central processor 344 and any other appropriate components to provide power at a suitable voltage for the respective component. The power supply circuit connections are not shown in order not to obscure the other features of the braking system 300 but may include connections to the brake drive system 304, including the compressor 310, and valve manifold 312, to the sensor module 342, to the fixed control panel 338, to the RF subsystem 340, and to other components of the braking system. The power supply circuit receives power from the tow vehicle battery 326 and converts this power as appropriate and regulates the supply circuit to other components. In some installation, the towed vehicle may be towed and braked for many days before the battery is depleted.

The power control system 306 also optionally maintains the charge status of the towed vehicle battery 326. A voltage detector 330 monitors the voltage at the battery. This information is provided to a battery charger circuit 329 which applies power to the battery 326 as may be suitable to maintain the battery. A DC power source 346, such as the tow vehicle electrical system provides power to the charger circuit that is regulated and applied to the battery. In some embodiments, the tow vehicle trailer harness has a socket connector to receive a plug 348 from the tow vehicle. This plug is wired into the battery charger circuit 329 as shown. There are a variety of suitable socket and plug systems with two to seven or more connectors and in different flat or round shapes. For battery charging purposes the plug 348 requires only two connectors, however any other connector that provides power may be used.

In some embodiments, the tow vehicle does not have a trailer harness but only a suitable power supply connector. In some embodiments, the plug is connected to the main controller with a cable, such as a 2 or 4 wire electrical cable, that extends from the main controller in the engine compartment far enough to reach the socket of the tow vehicle. This allows the power to be connected without accessing the engine compartment of the towed vehicle. In some embodiments, the main controller is connected to a cable that extends to a socket at the exterior front of the towed vehicle at which the cable is connected. In order to make the electrical connection, an operator uses a cable with a plug at each end. One end is plugged into the socket on the tow vehicle and the other end is connected to the socket on the towed vehicle.

The power supply circuit may power the braking system using power from the tow vehicle DC power source 346 and using battery power 326 of the towed vehicle. The towed vehicle battery provides a reservoir of high current power for sudden high power demands and also allows the braking system to be operational when it is not connected to the tow vehicle or when the tow vehicle is not generating power to the towed vehicle. By maintaining the battery 326 when the tow vehicle DC power source 346 is available, the reliability of the braking system 300 is enhanced. In addition, the towed vehicle is maintained in a state that is ready for independent operation after it is unhitched from the tow vehicle. In some embodiments, the power supply circuit draws power only from the battery. The battery charger circuit and tow vehicle connection may be excluded or provided as an independent and separate unit.

There are a variety of techniques and methods for maintaining the electrical condition of a battery and these may differ for different types of batteries. The specific timing and power characteristics applied to the battery may be adapted to suit any particular type of battery. The technique may be driven by the central processor or independently by the power control system 306 or battery charger circuit 329. In some embodiments, a battery charger controller operates in three stages. In the first stage, a high current, e.g. 3 A to 10 A is applied to the battery when the battery is below a first threshold such as 70% to 90% of its fully charged state. In the second stage, a low current, e.g. 0.3 A to 1 A is applied to the battery when the battery is not fully charged, but above the first threshold. In the third stage the battery is fully charged but is allowed to fall below a second threshold such as 95% to 98% charged. The low current is applied periodically to maintain the battery between the second threshold and a fully charged state. When the towed vehicle braking system is actuated, a high current is applied to the air pump and other components and the battery is recharged over a longer period of time in between braking actuations so that it is ready for the next braking and also ready to start the towed vehicle engine when the towed vehicle is unhitched.

The voltage sensor 330 allows the braking system 300 to determine the voltage of the battery at any time. For a common lead-acid 12-volt vehicle system, the battery voltage will be no more than 12.9 volts, when the battery is fully charged. A working battery will typically have about 12 volts and may operate at less than 12 volts when partially discharged, but should not have more than 12.9 volts. Other types of batteries similarly have a fully charged voltage. For example, some vehicles operate partially or fully with 48V electrical systems. When the towed vehicle engine is started, then the engine drives an alternator 327 that applies power to the battery. The power applied to the battery increases the voltage, as measured at the battery beyond the maximum fully charged voltage. The voltage detector 330 is thereby able to determine when the towed vehicle engine is running based on the voltage at the towed vehicle battery. This information may be provided to the central processor 344 directly or through the power control system 306. As an example, there may be a predetermined threshold of 12 volts or 12.9 volts or another value. When the voltage is above the threshold, then the braking system may declare that the alternator is operating and the towed vehicle engine is on. When the voltage is below the threshold, then the towed vehicle engine is off.

As shown, the braking system 300 is positioned in the engine compartment in front of the towed vehicle firewall 351 and outside of the passenger compartment 350. By placing almost all of the braking system under the hood in the engine compartment it is easily accessed when necessary but is out of the way of the driver and passengers. This position provides convenient access to the brake power booster 322, breakaway cable 334 and battery 326. The engine compartment is also closest to the tow vehicle which enhances communication with the hub 28 and tablet 30. In some towed vehicles, this front compartment may not include an engine, the brakes, a battery or some combination of the three and the firewall 351 is not for fire. It is only a wall perhaps by another name. Nonetheless, almost every vehicle has a compartment of some kind that is in front of the driver, that is separated from the driver by a wall, and that includes access to the vehicle brakes. In this description, this front compartment will be referred to as the engine compartment. This is for convenience and does not exclude rear engine, cab over, electric wheel hub motors and other types of vehicles.

As shown in this example, the power control system 306, central processor 344, sensor module 342, breakaway status detector 336, RF subsystem 340 and fixed control panel 338 are all part of a main controller 302. These components may be built on a single circuit board or on multiple circuit boards. In either case all of these components may be mounted within a single housing that surrounds and encloses the components. The housing is useful to protect the components from dirt and moisture that may be common in an engine compartment. The main controller may be configured as a single compact unit in a single housing with external connectors. All or some of the components may be incorporated into a single integrated circuit. By providing the control board as a single unit in one housing, the installation of the braking system is simplified. As shown the main controller has only a few external connections. These external connections are to the breakaway cable receiver 332, the towed vehicle battery 326, the tow vehicle DC power source 346, such as through a trailer brake system, and the brake drive system 304 of compressor 310, manifold 312 and sensors 324. This simplified approach with four external connections allows the braking system to be quickly and easily installed. As mentioned, the external power connection is optional.

The RF subsystem allows additional equipment and functions to be installed without making any physical connections to the main controller 302. Additional functions may include vehicle tire pressure, vehicle brake light status, vehicle position, attitude, and other features.

In the illustrated embodiments and as shown for example by the breakaway detector 22 in FIG. 1, the braking system configuration allows the system to be operated without opening the hood of the vehicle, that is without opening the engine compartment. The user can attach the breakaway cable 334 to the cable receiver 332 at the front of the towed vehicle, for example on or under the front bumper. The user may optionally attach the power supply plug 348 to the tow vehicle electrical harness typically near the tow vehicle hitch. The RF subsystem and the portable control panel allow the user full control over the connected and active towed vehicle braking system without opening the hood of the vehicle or accessing the engine compartment. Similarly, the towed vehicle braking system may be disconnected from the tow vehicle and shut off by unhitching, removing the breakaway cable, and disconnecting the power plug. The portable control panel provides access to all of the main controller features and functions.

To operate the actuator 314, in the form of a pneumatic cylinder, there is at least one valve in the manifold 312 that releases air from the compressor 310 into the cylinder to drive the piston away the brake. There may be another valve to release air from the cylinder to allow the piston to move freely or to drive the piston toward the brake. One or more pressure sensors in or around the cylinder may be used to determine whether the cylinder is energized and in which directions.

As mentioned above, the towed vehicle braking system uses a battery 326 coupled to a power supply system 306 to power the main controller 302 and all of the other components of the braking system. The controller operates the brake drive system 304, such as a compressor, manifold, and actuator. The brake drive system is coupled to the brake pedal connector 318 that is configured to connect to a brake pedal of the brake of the towed vehicle. The brake drive system is connected to the brake pedal connector to actuate the brake of the towed vehicle through the brake pedal connector by applying a positive pressure to the brake pedal connector to move the brake pedal. The main controller 302 includes an inertial sensor 341 to detect deceleration of the towed vehicle. The controller then causes the operation of the brake drive system in response to the inertial sensor.

In the illustrated examples, the battery 326 is the main towed vehicle battery that is used to power all towed vehicle electrical systems and that is maintained by the towed vehicle engine. The towed vehicle engine provides mechanical energy to an alternator 327 which converts the mechanical energy into electrical energy to charge the battery. The alternator may include or be connected to a voltage regulator (not shown) to control the charge applied to the battery by the alternator. This battery is connected to the power supply system 328 and provides sufficient power to operate the towed vehicle braking system when the towed vehicle engine is off.

The power control system 306 may be connected to a DC power source 346 of a tow vehicle. This connection may be through a conventional electrical trailer connector or through another electrical connector to the electrical system of the tow vehicle. When the tow vehicle is connected, then it provides DC power to the power supply system 328. This power may be used to power the main controller 302 and it may be used to power a battery charger circuit 329. The battery charger circuit is particularly useful to charge the battery when the towed vehicle engine is off and the towed vehicle is being towed by the tow vehicle. Because the brake drive system 808 is used only rarely, the battery may be charged slowly but provide a reserve of much greater power through the power supply system when the brake drive system is operated.

The voltage detector 330 monitors the voltage of the battery. It is coupled to the battery charger circuit 329 so that the battery charger circuit can regulate the power supplied to the battery based on the charge state or voltage of the battery. The voltage detector is also connected directly or through the battery charger circuit to an ON/OFF circuit of the main controller. The ON/OFF circuit turns on or off the brake drive system based on the measured voltage. The voltage detector provides a signal, such as a voltage, a digital output value, or an alert that represents the voltage of the battery. In some embodiments, a voltage output of the voltage detector is sampled at the charger circuit and converted into a digital representation of the voltage. In some embodiments, the voltage detector applies the detected voltage to one or more internal thresholds and provides a digital value or an alert to indicate one of multiple different ranges that the battery voltage is within.

The ON/OFF circuit turns the brake drive system off when the detected voltage is indicated as being above a threshold. A battery voltage above a threshold, such as 12 volts, indicates that the battery is being charged by the alternator. This indicates that the towed vehicle engine is on and someone is driving the towed vehicle apart from the tow vehicle. By turning off the brake drive system, the driver's control of the vehicle is unimpeded. If the battery voltage is below the same threshold or another lower threshold, then the ON/OFF circuit turns on the brake drive system. The lower voltage indicates that the towed vehicle engine is off and the towed vehicle is not being driven. The threshold may be configured to suit different vehicles that operate at different voltages or that have batteries that operate at different voltages. Currently some vehicles operate at 48 volts and older or smaller vehicles may operate at 6 volts, but any other threshold may be used depending on the towed vehicle.

By providing the ON/OFF circuit, an operator need not manually turn the towed vehicle braking system on and off. In some embodiments, the towed vehicle braking system does not have an on/off switch but automatically determines when to turn the brake drive system on and off using the battery voltage. In some embodiments, the user is able to turn the towed vehicle system on and off using an integrated control panel or a portable control panel or other mobile device. The ON/OFF circuit is able to intervene as an additional safety feature in the event that the user fails to turn off the towed vehicle braking system.

Additional inputs may be used to complement or replace the battery voltage detector 330 as an input to the ON/OFF circuit 820. The tow vehicle input DC power connection 348 may be used as an input. This power is provided only when the towed vehicle is attached to the tow vehicle. Accordingly, if there is no input power, then it may be inferred that the towed vehicle is not being towed and the brake drive system may be turned off. If there is input power then the towed vehicle is attached to the tow vehicle and the brake drive system is turned on. A breakaway detection system may be used as an input. If the breakaway cable is attached to the breakaway detector, then the towed vehicle is being towed and the brake drive system is turned on. Additional inputs and connectors may be used to suit different implementations. These two inputs may be combined with the battery voltage and the inertial sensors to determine ON/OFF status.

Figure 4:
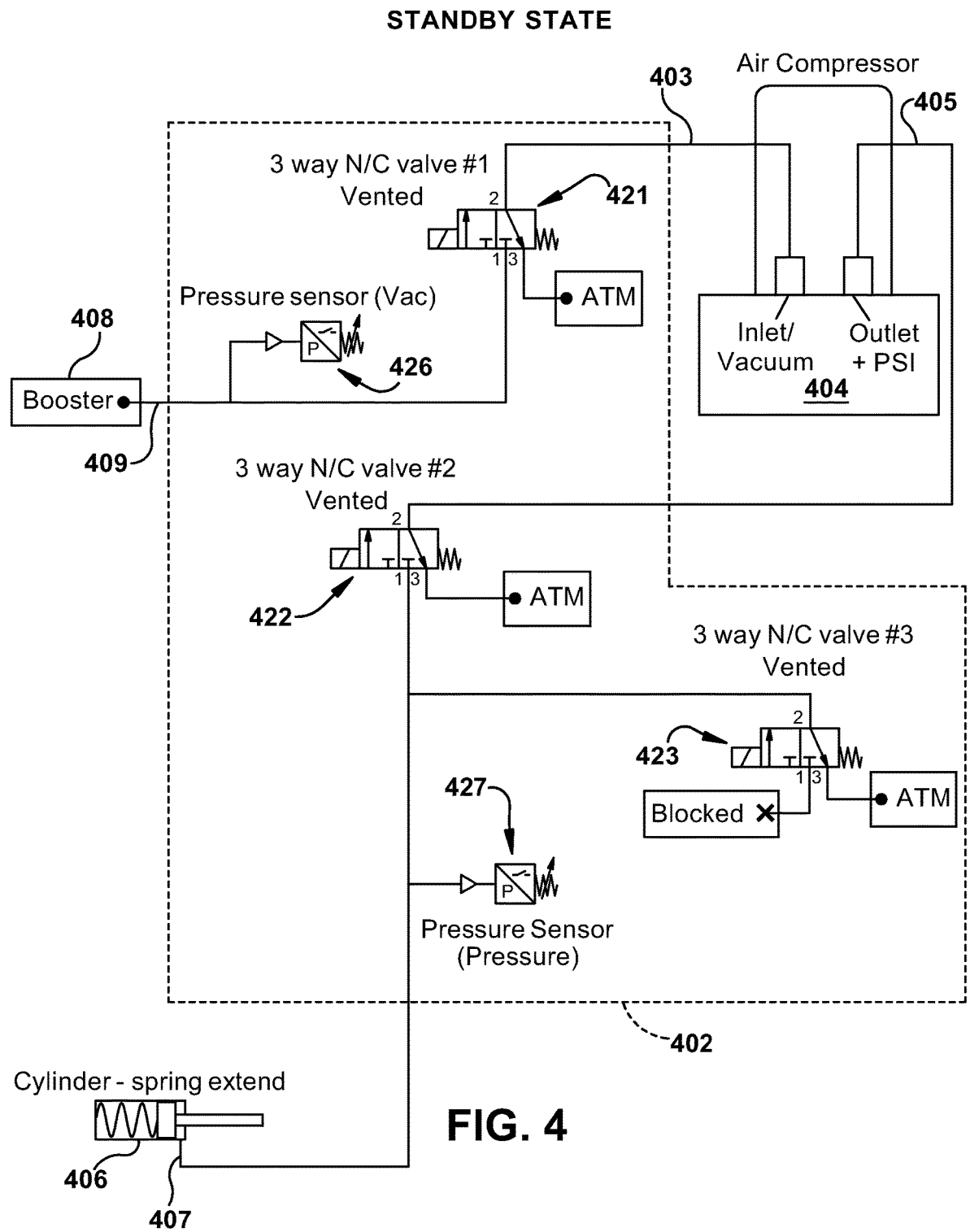
FIG. 4 is a pneumatic valve flow diagram of a brake drive system in a STANDBY state according to embodiments of the invention.

FIG. 4 is a diagram of a pneumatic system in an active state ready to move to states for maintaining a vacuum in the power booster and for driving the cylinder to operate the brakes with a single compressor. This is done in part by use of a manifold 402 as described above. The manifold is controlled by the central processor based on the state of the braking system 300. The central processor uses the sensors to determine the state of the towed vehicle and then configures the manifold and other components for the particular state. In the example of FIG. 4, the braking system 300 is at rest and the manifold is configured for initial active state. This state is entered on initial activation, upon system deactivation, such as when the towed vehicle is being driven and is no longer being towed, and during much of the time that the towed vehicle is being towed.

The manifold 402 of FIG. 4, is coupled to a single air pump or air compressor 404 as it is labeled in the drawing figure. The air pump has a high pneumatic pressure output line 405 through the manifold to a pneumatic cylinder input line 407 to a cylinder 406. The cylinder has a piston to drive a brake pedal as discussed above. In this example, the piston is driven by the single pneumatic pressure input line 407 to alternately drive or release the piston. In the illustrated example, the piston is shown as being biased against the pneumatic pressure by a spring so that when the pneumatic pressure is released the spring pushes the piston back to the neutral or brakes off position. Other piston drive configurations may be used to suit other types of cylinders and manifolds. In some embodiments, pneumatic pressure is applied on both sides of the piston to drive the piston in either direction. The air pump 404 has a vacuum inlet line 403 that connects through the manifold 402 to a vacuum supply line 409 of a brake power booster 408.

In this configuration, the air pump, when activated draws air from the vacuum inlet 403 and drives the air out the pressure outlet 405. The manifold operates valves 421, 422, 423 in response to pressure sensors 426, 427 and commands from the braking system central processor to determine how the air pump is connected. In this way the manifold controls the functions that the braking system performs. In the illustrated embodiment, the air pump either provides vacuum to the power booster or pressure to the brake actuation cylinder but not both. As a result, a less powerful compressor is necessary than would be necessary to perform both tasks simultaneously. Because the brake power booster is maintained with vacuum, the power booster is operational even without the vehicle engine operating. The brake actuator benefits from the power booster when it actuates the brakes. This also allows for a less powerful compressor than if the brake actuator were operating the brakes without power assist. The illustrated configuration may be modified to suit other compressors and other brake systems.

In the active state, the vacuum in the power booster 408 is held and the actuation cylinder 406 is free to move. The air pump 404 is open to atmosphere. In other words, if the air pump were activated it would draw air from atmosphere and push it out to atmosphere.

This resting state configuration is employed under two very different conditions. In the first condition the system is off. The towed vehicle is not being towed. It may be parked or being driven and so the braking system is deactivated. In this condition, no operations are performed. The second condition is most of the time during which the towed vehicle is being towed. Most of this time, the tow vehicle and towed vehicle are moving along the road connected together without any braking. In this condition, the braking system is activated and standing by ready to perform braking functions. The braking system is monitoring conditions to determine when to charge the power booster and when to brake. To facilitate this active state there are two pressure sensors in the illustrated manifold 402. A vacuum pressure sensor 426 monitors vacuum at the power booster. As long as the booster vacuum is high enough, no action is taken. A cylinder pressure sensor 427 monitors the pressure at the cylinder to ensure that there is no significant pressure and the piston is able to move freely in the cylinder.

In FIG. 4, the manifold has three valves to control the effect of the air pump. These are shown as 3-way NC (Normally Closed) valves but other types of valves or combinations of valves may be used alternatively. The first 421 of the three valves, the booster valve, has a first port coupled directly to the power booster 408 vacuum inlet 409, a second port is coupled to the air pump vacuum inlet 403 and a third port is coupled to the atmospheric ambient air. In the active state, the air pump vacuum inlet is coupled to the ambient and the power booster line is blocked. This setting allows the air pump to take in ambient air and prevents any leakage of the vacuum from the power booster. The 3-way valve 421 has two positions, the first is vented to atmosphere as shown and the second is energized as shown in FIG. 5.

Figure 6:
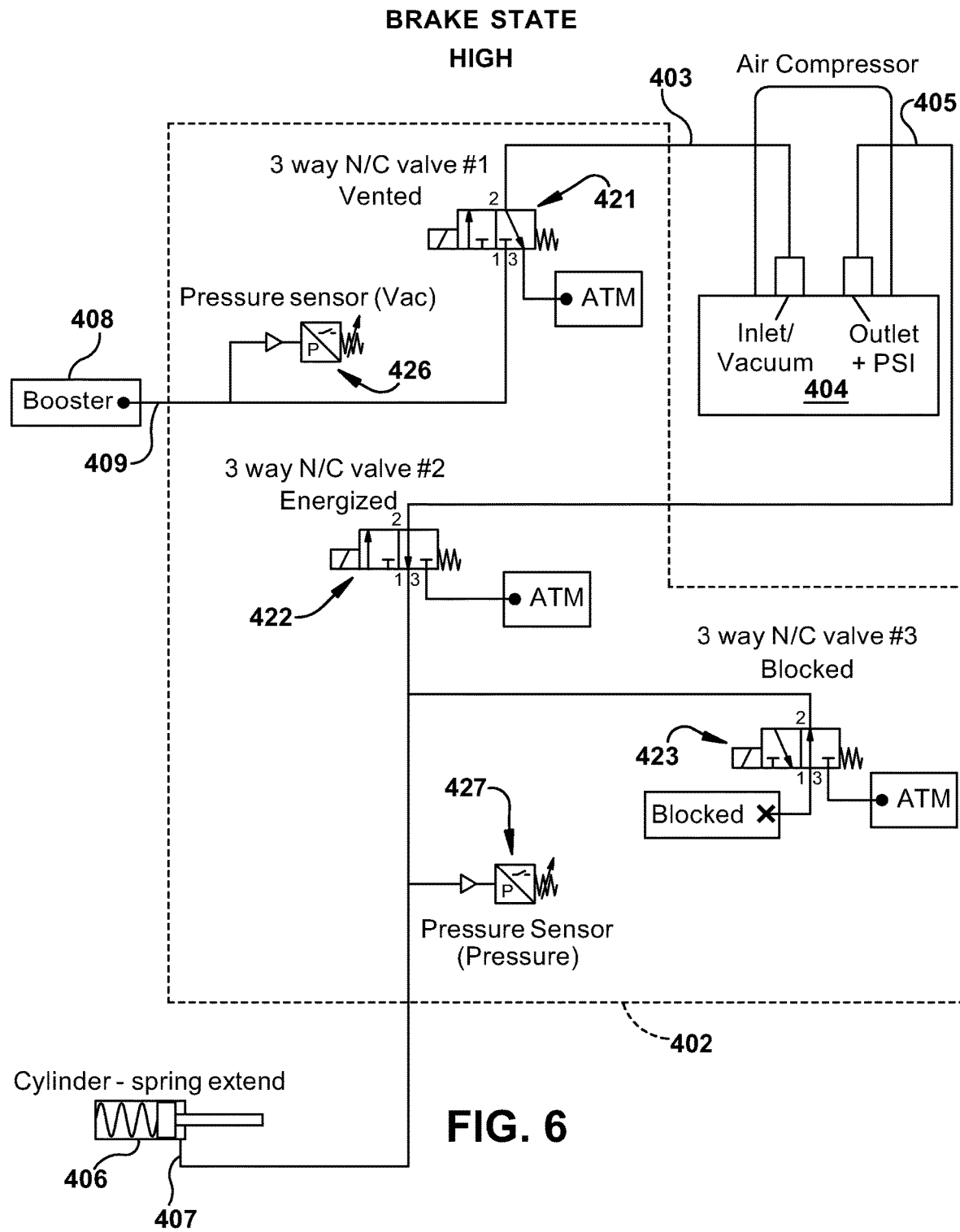
FIG. 6 is a pneumatic valve flow diagram of a brake drive system in a BRAKE state with high brake pedal force according to embodiments of the invention.

A second 3-way valve 422, a cylinder valve, is connected to the cylinder 406 in a similar way to the first valve. The first port is coupled directly to the cylinder pressure input line 407. The second port is coupled directly to the air pump pressure outlet 405 and the third port is coupled to the atmospheric ambient air. As with the vacuum line, in the active state the air pump pressure outlet port is coupled to the ambient port and the cylinder port is blocked. This first of the two positions is a vented position. The second position of the cylinder valve 422 is energized as shown in FIG. 6 to drive the brake actuator 406. This vented setting allows the air pump to provide air pressure on the line without affecting any other part of the system by venting any pressure to ambient. The air in the cylinder is maintained in the cylinder by the cylinder valve 422. The air pump is not operated in the active state, but even if it is, the inlet and outlet are open to atmosphere, so air pump operation will not affect the pressure on the booster or the cylinder.

The manifold has a third cylinder relief valve 423 between the cylinder valve 422 and the cylinder. The cylinder relief valve has a first port that is blocked, a second port coupled to the cylinder pressure line 407 and a third line coupled to the atmospheric ambient air. In the active state, as shown, the cylinder relief valve 423 connects the cylinder pressure at the second port to the ambient at the third port. This is a vented position of the valve. This valve allows any pressure in the cylinder to be released while the cylinder valve prevents the air pump from applying any pressure to the cylinder. The brake pedal in the active state is free to move through its entire travel and its position is not affected by the air pump. The second position of the cylinder relief valve is blocked as shown in FIG. 6.

Figure 5:
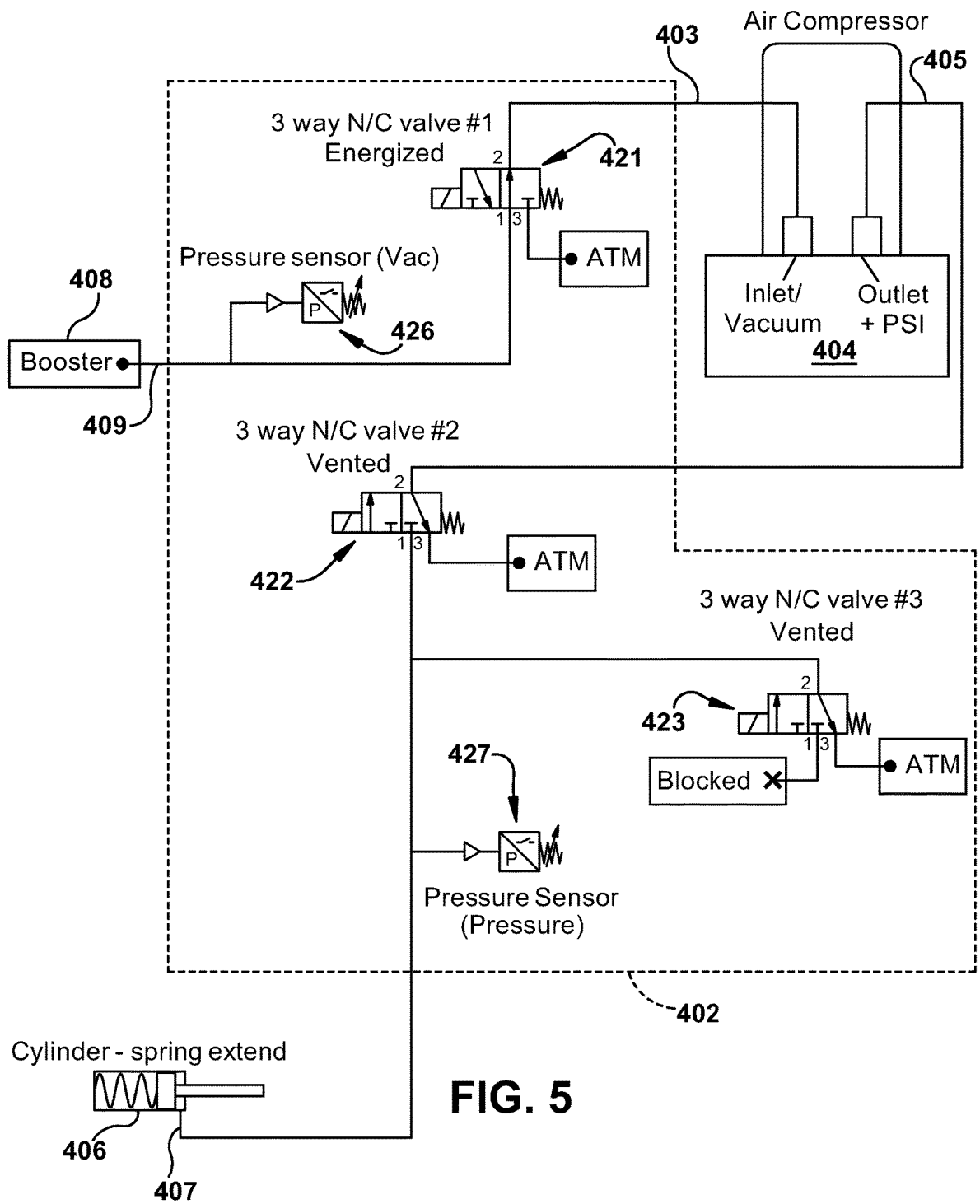
FIG. 5 is a pneumatic valve flow diagram of a brake drive system in a BOOSTER state according to embodiments of the invention.

FIG. 5 is a diagram of the pneumatic system in the booster maintenance or booster state. The system will enter the booster state in response to the booster pressure being low as measured by the booster pressure sensor 426 and the brakes not being actuated as determined by the central processor based on the sensors. The first valve 421 is operated to connect the first port coupled to the booster vacuum line 409 to the air pump or air compressor vacuum inlet 403. This is the energized position. The second and third valves are not moved. The air pump is operated to pump air out of the power booster through the vacuum line 409 to the booster and out to ambient through the second valve 422. After the vacuum pressure is sufficient, full, or high enough as measured by the vacuum pressure sensor 426, then the air pump can be deactivated and the first valve moved to the active state. The other two valves 422, 423 are not changed from the active state. This allows the air pump to exhaust air into the atmosphere through the cylinder valve 422 while operating as a vacuum pump for the power booster.

FIG. 6 is a diagram of the pneumatic system in a first part of the brake state. The system enters the brake state when the central processor determines that the towed vehicle brakes should be energized by the brake actuator 406. This state will be entered without regard to the condition of the power booster vacuum. To enter the brake state, the booster valve 421 is placed in the vented condition as in the active state. The air pump when activated draws air through the booster valve 421 to supply to the cylinder. The cylinder valve 422 is energized to allow the air pump to supply pressure to the cylinder input line. This drives the piston in the cylinder of the brake actuator. The cylinder relief valve 423 is blocked. The blocked cylinder relief valve 423 forces the air to the cylinder with no exit to atmosphere. This applies the maximum amount of compressed air to the cylinder to effect a swift and sure brake pedal action.

During the brake state, the cylinder pressure sensor 427 may be read to determine the pressure in the cylinder and control the pressure generated by the air pump. In this way, the force applied to the brake pedal by the actuator may be adjusted. In some embodiments, the amount of deceleration is monitored by the central processor 344 using the connected inertial sensors 342. The force applied to the brakes by the brake actuator 314 is adjusted to correspond to the amount of deceleration. In many braking circumstances, a tow vehicle driver will brake gently and then release the brakes or will change the pressure against the brakes during a single braking period. The central processor moderates the amount of braking of the towed vehicle by adjusting the operation of the air pump in response to the cylinder pressure sensor and the inertial sensors. This allows the central processor and the air manifold to align the towed vehicle braking with the tow vehicle braking.

Figure 7:
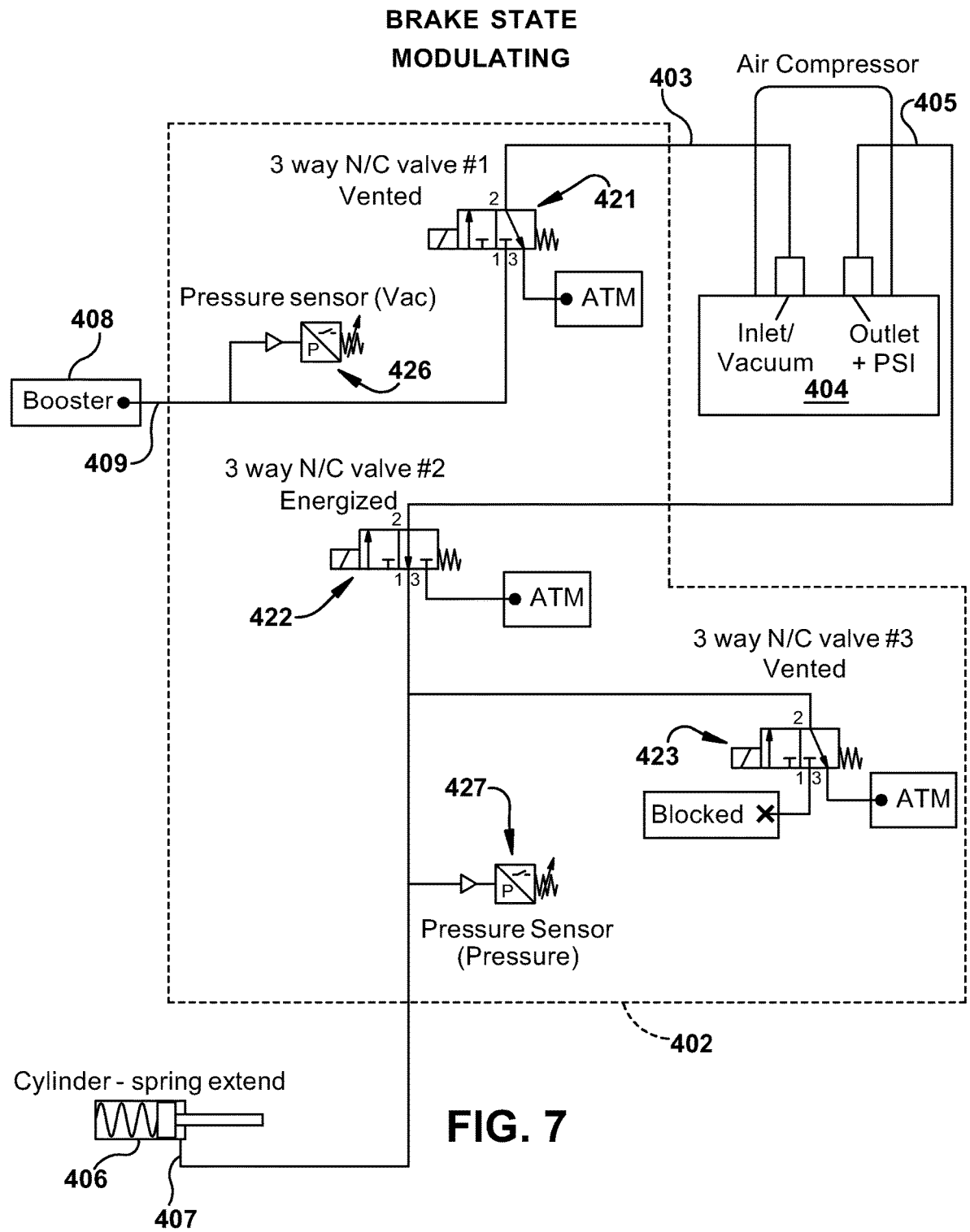
FIG. 7 is a pneumatic valve flow diagram of a brake drive system in a BRAKE state with modulation of the brake pedal force according to embodiments of the invention.

FIG. 7 is a diagram of the pneumatic system in a second part of the brake state in which the brake pedal positive pressure is modulated. The system has already entered the brake state in response to the main controller command as shown in FIG. 6. The booster valve 421 is placed in the vented condition, the air pump is activated, and the cylinder valve 422 is energized to allow the air pump to supply pressure to the cylinder input line. In this part of the brake state, the cylinder relief valve 423 is vented to moderate the force applied to the brakes by the brake actuator 314. The relief valve may be quickly opened and closed to adjust the positive pressure to correspond to the amount of deceleration. The central processor opens the relief valve 423 to atmosphere without opening the cylinder valve 422 in order to bleed pressure from the cylinder to further reduce the braking force. Either one or both of the two controls, air pump operation and valve position, allow a fine degree of control over the brake pedal pressure. It also allows the central processor to apply and release the brakes very quickly.

In FIGS. 6 and 7 the same cylinder relief valve is presented in two different possible states. The first state, represented in FIG. 6, is blocked to allow the full force of the air pump to be applied against the cylinder. The second state of the same valve, represented in FIG. 7, is vented to allow pressure in the cylinder to be released. In this pneumatic configuration, the piston is biased to the no braking position by a spring. Accordingly, when the relief valve goes to the vent position, the piston, under the force of the spring pushes the air out through the relief valve. The amount of released air will depend on the amount of the time that the valve is open. With enough time, the pressure against the brake pedal will be completely relieved.

The controller can use the amount of open time and the amount of shut time as a type of pulse width modulation to reduce the positive pressure. The relieve valve may be opened with e.g. a 20% duty cycle to reduce the positive pressure moderately and opened with e.g. a 60% duty cycle to reduce the positive pressure significantly. The particular duration of each valve opening for each time period may be adjusted based on the cylinder pressure sensor and the accelerometer. The desired duty cycle may depend on the response of the towed vehicle's brakes, the vacuum pressure in the booster and the configuration of the vehicle braking system such as the power of the air pump, the size of the air supply tubes, and the flow rate through the relief valve.

In other embodiments additional valves allow the compressed air to be applied to the cylinder on either side of the piston to drive the piston in one direction or the other. This allows the piston to quickly move in either direction with no need for a spring. In another embodiment, the brake is operated with a motor connected to a cable spool, worm gear, linear actuator or another system. In such embodiments, no manifold or cylinder pressure sensor is used but other sensors may be used to provide feedback about brake operation. With any actuator, the system may still have an active state, a boost state, and a brake state. The states do not depend on the nature of the actuator.

Figure 8:
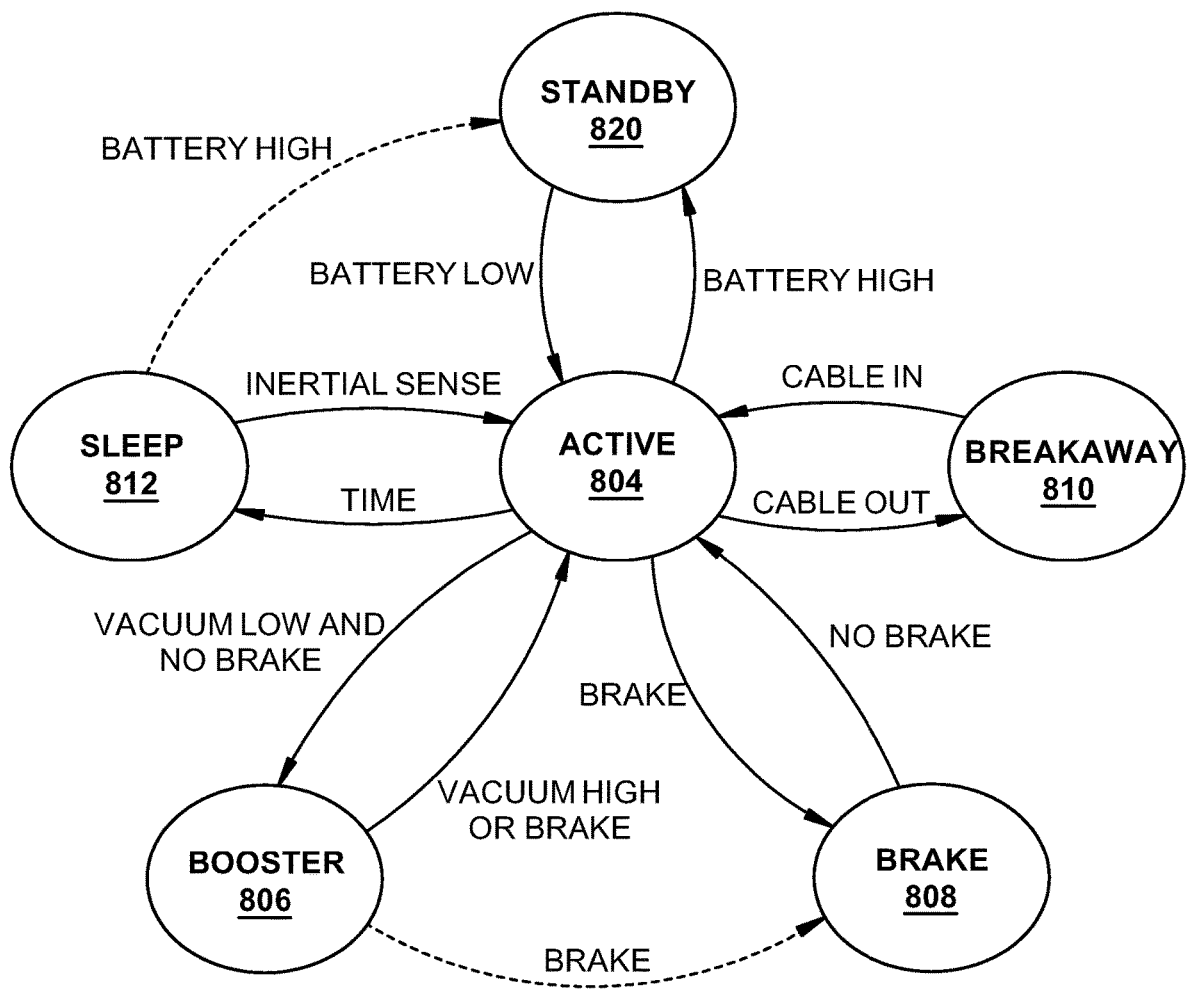
FIG. 8 is a state diagram of a brake drive system according to embodiments of the invention.

FIG. 8 is a state diagram showing transitions between states described above, i.e. active, booster, and brake. There are also additional standby, sleep and breakaway states. As the towed vehicle is driven into position behind the tow vehicle, the braking system begins in a STANDBY state 802. When the tow vehicle engine is shut down, the braking system then moves to the ACTIVE state 804. In some embodiments, the system moves to the ACTIVE state 804 in response to detecting a low battery voltage at the battery voltage sensor 330. The braking system returns to the STANDBY state upon receiving an operator command or another sensor input, such as detecting a high battery voltage. The high battery voltage indicates that the towed vehicle engine is running and the alternator is charging the battery. The low battery voltage indicates that the towed vehicle is shut down or off. The system may also be moved to the ACTIVE state by an operator operating a control on the fixed or portable control panel or by the central processor sensing some other condition.

The difference between the low and high battery voltage may be determined by comparing the voltage to a suitable predetermined battery voltage threshold. As an example, the threshold may be 12 volts for a typical automotive application. If the battery voltage is above the 12V threshold, then the braking system goes to the STANDBY state. If the battery voltage is below the 12V threshold, then the braking system goes to the ACTIVE state. For other vehicles a higher or lower threshold may be used. The threshold may be pre-configured or programmed into a configuration register of the voltage detector, the central processor, or another component by an installer or user using a control panel. While a simple threshold system is described herein, additional criteria and more complex decision systems may be used to suit particular implementations. The particular thresholds are provided as examples and may be modified to suit particular batteries and operating parameters.

The braking system moves from the ACTIVE state 804 and enters the BRAKE state 808 upon detecting braking by the tow vehicle. The braking system exits from the BRAKE state 808 and enters the ACTIVE state 804 when it detects that the tow vehicle is no longer braking. As mentioned above, the BRAKE state may have two parts for high pressure and for modulated pressure as the system adjusts the braking pressure to match the deceleration of the towing vehicle. The modulated pressure provides better braking and reduced wear than systems that only allow for one level of braking to meet all conditions.

The braking system enters the BOOSTER state 806 upon detecting a low vacuum pressure in the brake booster. This occurs only when tow vehicle braking also is not detected. If tow vehicle braking is detected, then the low vacuum pressure is superseded by the need for braking and the system will nevertheless move to the BRAKE state regardless of the booster vacuum pressure as measured by the booster pressure sensor. The braking system moves from the BOOSTER state back to the ACTIVE state when the vacuum reservoir of the power booster is full. The braking system will also enter the ACTIVE state when braking is detected. The braking system is then able to enter the BRAKE state 808 from the ACTIVE state.

The central processor 344 is coupled to the vacuum sensor 324 to determine whether the vacuum reservoir in the power booster is low or full. In some embodiments, the vacuum sensor sends a voltage that is related to the sensed vacuum to the central processor. The central processor measures the voltage to determine whether the vacuum is below a predetermined vacuum threshold. If so then it commands the transition to the BOOSTER state. A software threshold allows the threshold to be modified in software to suit different vehicles. In some embodiments, the vacuum sensor compares the sensed vacuum to a reference threshold and then sends a signal to the central processor when the vacuum is below the reference value. This simplifies the operation of the central processor.

The ACTIVE state allows all valves and sensors to be normalized in preparation for the next state change. The brake drive system is active and ready to respond to commands. In some embodiments, the valves respond within fractions of a second and the air pump is powered on or off within fractions of a second. Accordingly, returning to the ACTIVE state helps ensure proper operation of the braking system. In some embodiments, braking must be applied very quickly and so the braking system has an optional transition from the BOOSTER state direct to the BRAKE state. In the pneumatic system of FIGS. 5 and 6, such a transition requires that all three valves be changed but that the air pump stay energized. If the valves respond to state changes more quickly than the air pump, then the optional path to exit the BOOSTER state and enter the BRAKE state will allow for a quicker response in a move to the BRAKE state.

The towed vehicle braking system enters a BREAKAWAY state 810 when the breakaway cable 336 is removed from the cable receiver 332. The breakaway system 308 operates to determine when the towed vehicle becomes unhitched during towing. In the BREAKAWAY state 810, the brakes are applied by the active brake drive system to stop the towed vehicle. This reduces the danger of the towed vehicle rolling free from the tow vehicle in transit. The BREAKAWAY state is only available as a transition from the ACTIVE state. As a result, when the towed vehicle engine is started in order to drive the towed vehicle, the braking system enters the STANDBY state and the braking system releases the towed vehicle's brakes allowing the vehicle to be driven. In some embodiments a user can force a transition from the BREAKAWAY state to the STANDBY or ACTIVE states using the fixed or portable control panel.

In the example ACTIVE 804, BOOSTER 806, BRAKE 808, and BREAKAWAY 810 states described herein the main controller 302, brake drive system 304, power control system 306 and breakaway system 308 are all fully active including the RF subsystem 340 of the main controller. The brake drive system 304 and the RF subsystem 340 in particular consume some power when active. The other systems may be fabricated from lower power and primarily solid state and integrated circuit components that consume very little power. In some embodiments, the main controller may operate for months without the RF subsystem with no significant impact on the towed vehicle battery.

In the STANDBY state the main controller 302 stays active, but the brake drive system 304 and breakaway system 304 may be turned off as these will not be used. This allows the driver to interact with the system through the portable control panel or any other wireless or wired interface but it reduces power consumption and any chance of undesired automated braking. Turning off the brake drive system prevents the brake drive system from applying the positive pressure to the brake pedal connector to activate the towed vehicle brakes.

In some embodiments, the towed vehicle braking system has a SLEEP state 812 to reduce power consumed by the system when the towed vehicle is neither being towed or operated. The SLEEP state 812 allows the brake drive system 304 and the breakaway system 308 to be turned off. The power control system 306 is still active to provide power to the main controller active components. Power to the other components may be disconnected to reduce consumption. In the SLEEP state the inertial sensor module 342 is active and coupled to the central processor 344 to detect motion of the towed vehicle. In some embodiments, if there is no detected motion for a predetermined time duration, e.g. two to six hours, then the system enters the SLEEP state. In the SLEEP state, in addition to powering off the brake drive system and the breakaway system, the RF subsystem 340 is placed in a low power mode.

In normal operation, such as in any of the other states, the RF subsystem is operational and active to communicate with any of the connected external components. This allows the portable control panel to be fully operational and also allows the braking system to benefit from any other connected components. When the towed vehicle is parked or stored, then there is no need for immediate communications with any external components. In some embodiments, the RF subsystem is turned off and consumes no power. In some embodiments, the RF subsystem is placed in a receive only mode. Receiving requires much less power than transmitting. In some embodiment, the RF subsystem is placed in a periodic wake mode. In this mode, the RF subsystem wakes periodically to transmit a general announcement or advertisement that makes it accessible to external components. If it receives no reply, then it powers off until the end of the next time period. The period may be 2 minutes, 5 minutes, 10 minutes, or another time period. The particular configuration of the RF subsystem in the SLEEP state may be modified to suit the particular wireless protocols and standards being used. In some embodiments, the RF subsystem shuts down higher power radios, such as Wi-Fi and unlicensed band operation and uses only lower power radios such as Bluetooth or NFC (Near Field Communications). In some embodiments, the SLEEP state turns off the RF subsystem entirely.

To exit the SLEEP state 812, the central processor receives input from the inertial sensor module indicating that the towed vehicle is being moved. In some embodiments, the movement is detected by accelerometers in roll, pitch or yaw axes. The sensor module may be responding to the vehicle being towed or a driver entering the vehicle or any other movement in any axis. The system then moves to the ACTIVE state 804.

In one use case, the towed vehicle is towed to a location with the braking system in the ACTIVE state. The towed and tow vehicle are then parked. After the predetermined timer expires, the braking system enters the SLEEP state. When the tow vehicle then starts up and moves back to the highway, the movement along the road is detected by the sensor module which transitions the braking system back to the ACTIVE state. These operations are performed by the braking system automatically without any interaction from any person.

In another use case, the towed vehicle is unhitched from the tow vehicle and driven to a parking spot. While being driven, the tow vehicle is in the STANDBY state. When the tow vehicle is parked and the engine is turned off, the braking system transitions to the ACTIVE state. After the timer elapses, the braking system transitions to the SLEEP state. When a driver returns and enters the vehicle, the corresponding motion of the vehicle is detected and the braking system transitions to the ACTIVE state. In an alternative embodiment, the braking system is able to transition directly to the STANDBY state when a high battery voltage is detected for example when the driver starts the engine to remove it from the parking spot. By transitioning directly to the STANDBY state, the braking system is able to take advantage of the power supplied by the vehicle to provide complete operation to the user.

In another use case, the braking system uses other or additional inputs to determine whether the towed vehicle is attached to the tow vehicle and is ready to or is being towed. The tow vehicle is ready to be towed when the breakaway cable is coupled to the cable receiver. Accordingly, in an embodiment, the main controller determines the breakaway cable status and if the cable is in the receiver, then transitions from the SLEEP state to the ACTIVE state. In another embodiment, the power supply circuit 306 detects that power 346 is being supplied from the tow vehicle through the trailer harness plug 348. This status is received at the processor 344 and the processor transitions the braking system from the SLEEP state to the ACTIVE state. Alternatively, both the breakaway cable and the external power must be connected to transition the braking system to the ACTIVE state. In another embodiment these two inputs are combined with the detection of acceleration in the inertial sensors for the controller to cause the transition to the ACTIVE state. These operations may be configured based on the configuration of the braking system and any external components. The configurations may be entered by an operator through the fixed or portable control panel.

The state transitions of FIG. 8 may be driven by the central processor 344. As described in the context of FIG. 3, the central processor is coupled to the inertial sensor module 342, to the battery voltage detector 330 and to the brake drive system 304. The central processor includes internal clocks for operating timers that may be used to wake or turn off any or all of the parts of the main controller 302 and the other connected systems. The central processor may include a state transition engine as a software routine or module or there may be a dedicated portion of the central processor that operates the state transition engine in hardware or firmware. Alternatively, there may be an independent module within or outside of the central controller to operate as a state transition engine. As explained above, the state transition engine turns various components on or off depending on the active state. This engine may be referred to an ON/OFF circuit that is implemented as hardware or software inside or outside of the central processor. The ON/OFF circuit operates to turn on and off the brake drive system to support the STANDBY and SLEEP states and also to turn on and off the breakaway system and RF subsystem to support the STANDBY and SLEEP states. The ON/OFF circuit may be configured to respond to the predetermined voltage threshold as described above.

Figure 9:
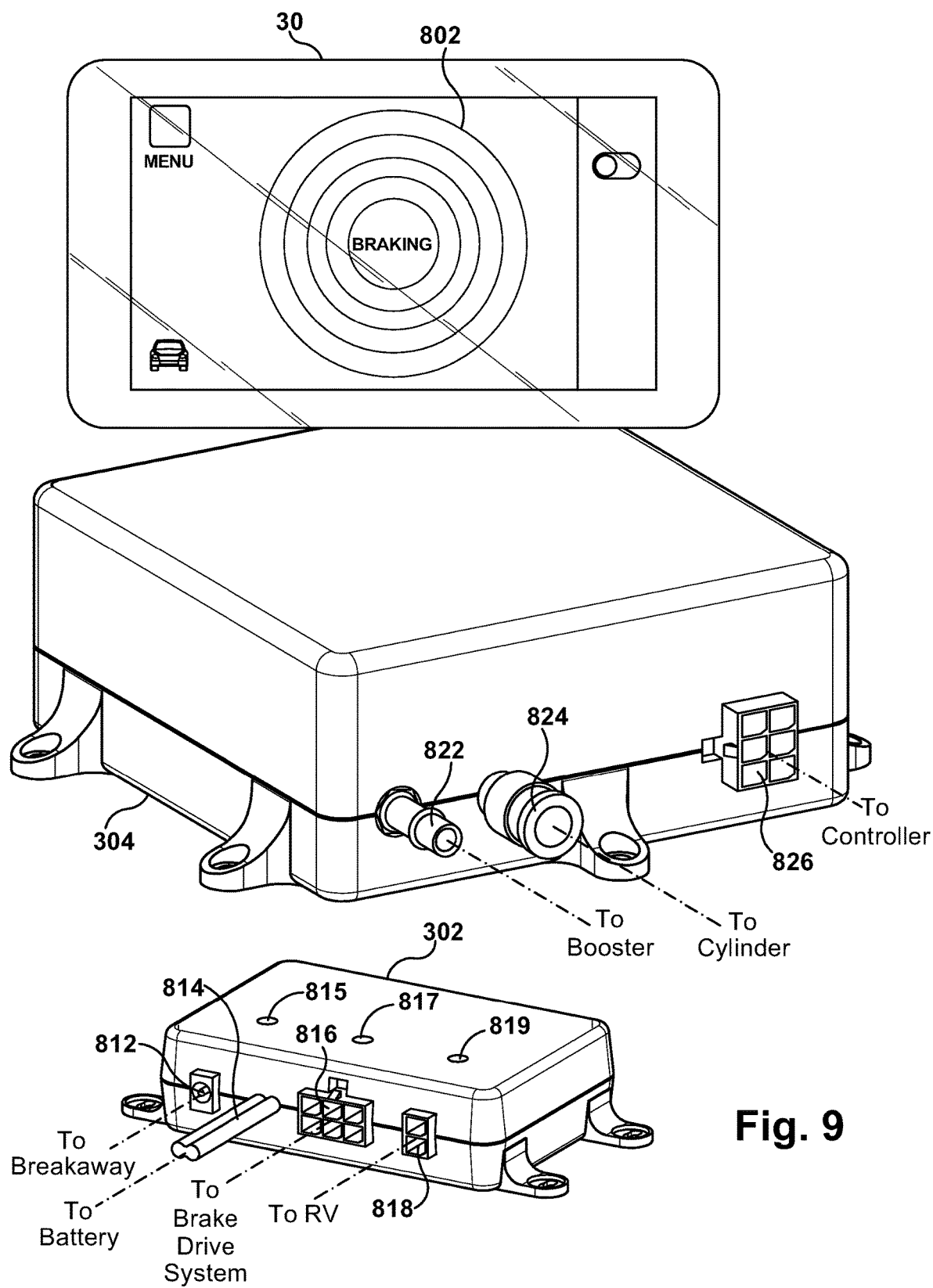
FIG. 9 is a perspective view of components of a towed vehicle braking system according to embodiments of the invention.

FIG. 9 is an illustration of components of the vehicle braking system including the main controller 302, the brake drive system 304 and the portable control panel 30. The main controller is contained within a housing with four external connectors 812, 814, 816, 818. An external fixed control panel has status indicators 815, 817, 819 associated with the connectors. Buttons or switches may optionally be included. The antenna 339 of the RF subsystem 340 is mounted within the housing and is not shown. The connectors include a breakaway detector connector 812, a battery power connector 814, a brake drive system connector 816 and a trailer harness power input connector 818. These connectors each are coupled to the respective internal components of the main controller as shown in FIG. 3, i.e. the breakaway status detector 336, the power supply circuit 328, the processor 344, and the battery charger circuit 329, respectively. The main controller housing includes tabs to allow it to be mounted conveniently in the engine compartment of the towed vehicle. The housing has a central seam around the outer periphery of the sides of the housing and encloses the components on all sides surrounding the internal parts for protection. In some embodiments, the housing has a base to which many of the components are mounted and a cover attached over the base to enclose the components.

The brake drive system 304 has an external connector 826 to the main controller. The illustrated brake drive system includes the air pump 310 and the manifold 312 as well as the pressure sensors 324, 325. The actuator 314, such as a cylinder is not within the brake drive system housing. Accordingly, the brake drive system has an external pressure fitting 824 that connects to a pressure fitting on the cylinder to drive the cylinder to actuate the towed vehicle brakes. The brake drive system similarly has a vacuum hose fitting 822 to connect to a vacuum supply hose to the power booster. This portion of the brake drive system housing also has tabs to allow it to be mounted in the vehicle engine compartment. In other embodiments, the cylinder is within the housing or another type of actuator such as a hydraulic, electric, or motorized actuator may be mounted within or outside the brake drive system housing with appropriate connectors. The brake drive system is also enclosed within a housing for protection from the environment of the engine compartment. A seam around the perimeter sides of the housing allows the housing to be opened for service. Alternatively, the seam may be in another place on the housing for example between a base and a cover or a pan and a lid to suit particular implementations.

The portable control panel 30 has a wireless connection to the main controller through which the entire towed vehicle braking system may be controlled. An antenna is concealed within the housing and not shown. As mentioned above, the portable control panel may be moved to different locations to operate the towed vehicle braking system as is convenient for the user. In this view, the tablet shows a braking status display 802 to indicate that the towed vehicle brakes are being applied by the braking system. This allows the user to observe what if any actions are being performed by the main controller 302. The tablet may also allow the user to manually apply the brakes, release the brakes and turn the towed vehicle braking system on or off, among other functions.

FIG. 10 is a process flow diagram for controlling the power of the brake drive system. This process may be performed by an ON/OFF circuit or by the central processor 344, or by a part of the power control system 306, or by another suitable component. At 102 the voltage of the towed vehicle battery is detected. At 104 the voltage is compared to a voltage threshold $V_T$. When the voltage is over the threshold, then it is inferred that the towed vehicle engine is running and that there is an alternator or generator applying a higher voltage power to the battery. If so, then at 106 the brake drive system is turned off. The brake drive system, as described above, is connected to a brake pedal connector to actuate the brakes of the towed vehicle through the brake pedal connector. As a result, when a user starts the vehicle, the brake drive system is turned off and the user will have complete control over the vehicle's brakes as the vehicle is being driven.

At 104 if the voltage is not over the threshold $V_T$, then the brake drive system is turned on at 108 or remains on if it is already on. This allows the towed vehicle braking system to operate the brakes while the vehicle is being towed.

In some embodiments, while the towed vehicle braking system is on and has power from the towed vehicle battery, the internal inertial sensors 341 detect accelerations in one or more axes at 110. If there is no acceleration in any axis after some predetermined time duration $T_D$, then it may be inferred that the towed vehicle has been parked. At 112 if there is no acceleration within $T_D$ or before the expiration of $T_D$, then the brake drive system may also be turned off at 110. This may be a lower power sleep mode. The process then waits for another instance of acceleration at 112, a manual turn-on signal, or another wake up command to turn on the brake drive system. When acceleration is detected, then the process goes to 102 to determine the battery voltage and turn the brake drive system on or off as described above.

The process of FIG. 10 allows the towed vehicle braking system to be used without a user ever needing to turn the system on or off. It turns off when the vehicle is driven and it turns off when the vehicle is parked. It is on only when the vehicle is turned off but is experiencing accelerations. These are the kind of accelerations that would be experienced when the vehicle is being towed by another vehicle. This avoids a risk that a user will forget to turn the system on or off and it eliminates any inconvenience to the user of reaching for a switch somewhere to turn the system on or off.

FIG. 11 is a process flow diagram for controlling the operation of the brake drive system air pump and valve manifold. The process may be performed by the main processor 344 or by a processor of the brake drive system 304 in response to inputs from inertial sensors 341, a breakaway detector 308, and other components. At 122 inertial sensors determine whether the towed vehicle is decelerating. If so, then at 128, the brake drive system applies a positive pressure to the vehicle brake pedal to apply the brakes. In some embodiments, this is done by activating the air pump or compressor, energizing a cylinder valve to connect the pump to the cylinder, and venting a power booster valve to block flow to and from the power booster. In some embodiments, the booster valve allows air to be drawn into the air pump. In some embodiments, the cylinder valve is connected between the cylinder and a pressure tank to pass air from the tank to the cylinder. The air pump is only used to replenish the air tank. Other configurations may alternatively be used. After braking, the process returns to 122.

If the vehicle is not decelerating, then at 124, the process determines if there is a vehicle breakaway. If so, suggesting that the towed vehicle is no longer attached to the tow vehicle but is moving along the road with no driver or controls, then at 128, the brake drive system is activated as described above. If there is no deceleration and no vehicle breakaway, then at 126, the vacuum pressure of the brake power booster is checked. If the vacuum pressure is low e.g. the pressure is less than a predetermined pressure threshold $P_{VT}$, then the air pump is activated to replenish the vacuum. The pump is activated, the booster valve is vented to allow air to be drawn from the booster reservoir and the cylinder valve is vented to allow air from the booster to be pumped to ambient. After braking, the process then returns to 122.

If there is no deceleration at 122, no vehicle breakaway at 124, and no low vacuum pressure at 126, then the process goes to an active state standing by at 132. The pump is deactivated, the cylinder valve is vented and the booster valve is vented. The process returns to 122 for the next deceleration and braking event. While this process is presented as flow chart, it may also be implemented as different states or as a response to alerts with priorities. As an example, each of the tests at 122, 124, 126 may be received at a decision instance as an alert. The breakaway alert might have the highest priority so that braking happens regardless of inertial events and the state of the power booster. The deceleration alert might have the next highest priority so that braking occurs regardless of the power booster state. The power booster vacuum alert has the lowest priority so that the vacuum booster is replenished only if there is no braking event.

A towed vehicle braking system is described that in some embodiments includes a brake pedal connector configured to connect to a brake pedal of a towed vehicle brake in a passenger compartment of a towed vehicle, a power supply circuit in an engine compartment of the towed vehicle coupled to a towed vehicle battery to receive power, and a brake drive system in the engine compartment connected through a wall to the passenger compartment to the brake pedal connector to actuate the brake of the towed vehicle through the brake pedal connector by applying a positive pressure to the brake pedal connector to move the brake pedal. An inertial sensor in the engine compartment detects deceleration of the towed vehicle, and a processor in the engine compartment coupled to the inertial sensor and to the brake drive system causes the brake drive system to actuate the brake in response to the detection of deceleration.

In some embodiments, the system includes a housing in the engine compartment and a control board in the housing and wherein the power supply circuit, inertial sensor and processor are attached to the control board within the housing. In some embodiments, the system includes a battery charger circuit in the engine compartment coupled to an external tow vehicle to receive power and coupled to the towed vehicle battery to maintain a charge of the towed vehicle battery. In some embodiments, the brake drive system comprises a pump coupled to a cylinder in the engine compartment to drive a piston in the cylinder to actuate the brake and wherein the pump is connected to the processor to control operation of the pump.

In some embodiments, the system includes an RF subsystem attached to the control board to provide communications with an external control panel. In some embodiments, the system includes the external control panel wirelessly connected through the RF subsystem for control of the system as a user terminal. In some embodiments, the system includes a breakaway detector coupled to the control board to receive a breakaway alert signal, to cause the controller to generate an alert to a driver of the tow vehicle through the portable control panel. In some embodiments, the system includes a breakaway system having a breakaway status detector in the engine compartment attached to the controller and a breakaway cable receiver coupled to the breakaway status detector and accessible from the exterior of the towed vehicle, wherein the breakaway cable receiver indicates a breakaway status to the breakaway status detector.

Some embodiments pertain to a towed vehicle braking system that includes a main controller mounted in an engine compartment of the towed vehicle, the main controller having an inertial sensor configured to detect deceleration of the towed vehicle and a processor, a brake drive system mounted in the engine compartment and connected to a brake pedal connector configured to connect through a firewall of the engine compartment to a brake pedal of the towed vehicle brake in a passenger compartment of the towed vehicle, wherein the processor causes the brake drive system to actuate the towed vehicle brake in response to the detection of deceleration, and an ON/OFF circuit of the controller to turn off the brake drive system when the towed vehicle is not being towed.

In some embodiments, the system includes a towed vehicle battery voltage detector coupled to the main controller and wherein the ON/OFF circuit turns off the brake drive system in response to the towed vehicle battery voltage being above a predetermined voltage threshold. In some embodiments, the ON/OFF circuit turns off the brake drive system in response to no detection of deceleration after a predetermined time duration. In some embodiments, the main controller further comprises an RF subsystem and an external control panel wirelessly coupled to the RF subsystem configured to control the main controller through the RF subsystem. In some embodiments, the external control panel is configured to send a command to the RF subsystem to turn the brake drive system on and off.

In some embodiments, the main controller further comprises a power control system to provide power to the processor and the brake drive system and a power plug outside the engine compartment connected to the main controller by a cable. In some embodiments, the main controller further comprises a breakaway status detector coupled to the processor, the system further comprising a breakaway cable receiver outside the engine compartment coupled to the breakaway status detector, wherein the breakaway cable receiver indicates a breakaway status to the breakaway status detector to cause actuation of the towed vehicle brake. In some embodiments, the brake drive system in the engine compartment comprises an air pump, an air manifold, and a pneumatic cylinder connected to the brake pedal to actuate the towed vehicle brake and coupled through the air manifold to the air pump to be actuated by the air pump.

Some embodiments pertain to a towed vehicle braking system that includes a brake drive system mounted in the engine compartment and connected to a brake pedal connector configured to connect through a firewall of the engine compartment to a brake pedal of the towed vehicle brake in a passenger compartment of the towed vehicle to actuate the towed vehicle brake, a breakaway cable receiver outside the engine compartment coupled to detect vehicle breakaway when a cable is removed from the receiver, and a main controller having a processor and an inertial sensor, enclosed by an external housing, the housing having a power connector to receive power from a battery of the towed vehicle, a brake drive system connector to transmit control to the brake drive system, and a breakaway status connector to receive vehicle breakaway status from the breakaway cable receiver.

In some embodiments the main controller comprises a battery charger circuit connected to the power connector to provide power to charge the battery, the housing further having a towing harness connector to receive power from a tow vehicle and wherein the battery charging circuit is connected to the towing harness connector to receive power to charge the battery. In some embodiments, the main controller further comprises an RF subsystem configured for wireless communication with external components.

While the present description is provided in the context of an installed braking system, many of the structures, features and operations may also be used with a portable towed vehicle braking system. In embodiments, a portable towed vehicle braking system may be connected to a vehicle interior power socket to obtain power to operate the braking system. The voltage at this interior power socket will be very similar to the power at the battery. The portable braking system may have a wired or wireless connection to a breakaway cable and may be operated using a portable control panel.

A lesser or more equipped brake activation system and wireless communication systems than the examples described above may be desirable for certain implementations. Therefore, the configuration of the system will vary from implementation to implementation depending upon numerous factors, such as price constraints, performance requirements, technological improvements, and/or other circumstances.

While the steps described herein may be performed under the control of a programmed processor, such as central processing unit, a microcontroller or by any programmable or hardcoded logic, such as Field Programmable Gate Arrays (FPGAs), TTL logic, or Application Specific Integrated Circuits (ASICs), for example. Additionally, the methods of the present invention may be performed by any combination of programmed general purpose computer components and/or custom hardware components. Therefore, nothing disclosed herein should be construed as limiting the present invention to a specific combination of hardware components.

The present description presents the examples using particular terms, such as towed vehicle, breakaway, breakaway detector, brake pedal, actuation arm, arm drive, sensor, switch, etc. These terms are used to provide consistent, clear examples, however, the present invention is not limited to any particular terminology. Similar ideas, principles, methods, apparatus, and systems can be developed using different terminology in whole, or in part. In addition, the present invention can be applied to ideas, principles, methods, apparatus, and systems that are developed around different usage models and hardware configurations.

In the present description, for the purposes of explanation, numerous specific details are set forth in order to provide a thorough understanding of the present invention. However, the present invention can be practiced without some of these specific details. In other instances, well-known structures and devices are shown in block diagram form. The specific detail can be supplied by one of average skill in the art as appropriate for any particular implementation.

The present invention includes various steps, which can be performed by hardware components or can be embodied in machine-executable instructions, such as software or firmware instructions. The machine-executable instructions can be used to cause a general-purpose or special-purpose processor programmed with the instructions to perform the steps. The machine-executable instructions may be stored in a controller or in a separate memory. Alternatively, the steps can be performed by a combination of hardware and software.

Aspects of the present invention can be provided as a computer program product that can include a machine-readable medium having instructions stored thereon, which can be used to program a computer (or other machine) to perform a process according to the present invention. The machine-readable medium can include, but is not limited to, floppy diskettes, optical disks, CD-ROMs, and magneto-optical disks, ROMs, RAMs, EPROMs, EEPROMs, magnet or optical cards, flash memory, or any other type of medium suitable for storing electronic instructions.

Although this disclosure describes illustrative embodiments of the invention in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A towed vehicle braking system comprising:
a brake pedal connector configured to connect to a brake pedal of a towed vehicle brake in a passenger compartment of a towed vehicle;
a power supply circuit in an engine compartment of the towed vehicle coupled to a towed vehicle battery to receive power;
a brake drive system in the engine compartment connected through a wall to the passenger compartment to the brake pedal connector to actuate the brake of the towed vehicle through the brake pedal connector by applying a positive pressure to the brake pedal connector to move the brake pedal;
an inertial sensor in the engine compartment to detect deceleration of the towed vehicle; and
a processor in the engine compartment coupled to the inertial sensor and to the brake drive system to cause the brake drive system to actuate the brake in response to the detection of deceleration.

2. The system of claim 1, further comprising a housing in the engine compartment and a control board in the housing and wherein the power supply circuit, inertial sensor and processor are attached to the control board within the housing.

3. The system of claim 1, further comprising a battery charger circuit in the engine compartment coupled to an external tow vehicle to receive power and coupled to the towed vehicle battery to maintain a charge of the towed vehicle battery.

4. The system of claim 1, wherein the brake drive system comprises a pump coupled to a cylinder in the engine compartment to drive a piston in the cylinder to actuate the brake and wherein the pump is connected to the processor to control operation of the pump.

5. The system of claim 2, further comprising an RF subsystem attached to the control board to provide communications with an external control panel.

6. The system of claim 5, further comprising the external control panel wirelessly connected through the RF subsystem for control of the system as a user terminal.

7. The system of claim 6, further comprising a breakaway detector coupled to the processor to receive a breakaway alert signal, and to cause the processor to generate an alert to a driver of the tow vehicle through the external control panel.

8. The system of claim 5, further comprising a breakaway system having a breakaway status detector in the engine compartment attached to the processor and a breakaway cable receiver coupled to the breakaway status detector and accessible from the exterior of the towed vehicle, wherein the breakaway cable receiver indicates a breakaway status to the breakaway status detector.

9. A towed vehicle braking system comprising:
a main controller mounted in an engine compartment of a towed vehicle, the main controller having an inertial sensor configured to detect deceleration of the towed vehicle and a processor;
a brake drive system mounted in the engine compartment and connected to a brake pedal connector configured to connect through a firewall of the engine compartment to a brake pedal of a towed vehicle brake in a passenger compartment of the towed vehicle, wherein the processor causes the brake drive system to actuate the towed vehicle brake in response to the detection of deceleration; and
an ON/OFF circuit of the main controller coupled to the brake drive system and configured to turn off the brake drive system when the towed vehicle is not being towed.

10. The system of claim 9, further comprising a towed vehicle battery voltage detector coupled to the main controller and wherein the ON/OFF circuit turns off the brake drive system in response to the towed vehicle battery voltage being above a predetermined voltage threshold.

11. The system of claim 10, wherein the predetermined voltage threshold is configured to indicate that a towed vehicle alternator is charging the battery.

12. The system of claim 9, wherein the ON/OFF circuit turns off the brake drive system in response to no detection of deceleration after a predetermined time duration.

13. The system of claim 9, wherein the main controller further comprises an RF subsystem and the system further comprises an external control panel wirelessly coupled to the RF subsystem and configured to control the main controller through the RF subsystem.

14. The system of claim 13, wherein the external control panel is configured to send a command to the RF subsystem to turn the brake drive system on and off.

15. The system of claim 9, wherein the main controller further comprises a power control system to provide power to the processor and the brake drive system and wherein the system further comprises a power plug outside the engine compartment connected to the main controller by a cable.

16. The system of claim 9, wherein the main controller further comprises a breakaway status detector coupled to the processor, the system further comprising a breakaway cable receiver outside the engine compartment coupled to the breakaway status detector, wherein the breakaway cable receiver indicates a breakaway status to the breakaway status detector to cause actuation of the towed vehicle brake.

17. The system of claim 9, wherein the brake drive system in the engine compartment comprises an air pump, an air manifold, and a pneumatic cylinder connected to the brake pedal to actuate the towed vehicle brake and coupled through the air manifold to the air pump to be actuated by the air pump.

18. The system of claim 9, wherein the ON/OFF circuit is further coupled to a tow vehicle power connection as an input to turn on the brake drive system when the tow vehicle power connection provides input power.

19. A towed vehicle braking system comprising:
a brake drive system mounted in an engine compartment and connected to a brake pedal connector configured to connect through a firewall of the engine compartment to a brake pedal of the towed vehicle brake in a passenger compartment of the towed vehicle to actuate the towed vehicle brake;
a breakaway cable receiver outside the engine compartment coupled to detect vehicle breakaway when a cable is removed from the receiver; and
a main controller having a battery charger circuit, a processor, and an inertial sensor, enclosed by an external housing, the housing having a towing harness connector to receive power from a tow vehicle, a power connector to receive power from a battery of the towed vehicle, a brake drive system connector to transmit control to the brake drive system, and a breakaway status connector to receive vehicle breakaway status from the breakaway cable receiver, wherein the battery charger circuit is connected to the power connector to provide power to charge the battery and wherein the battery charger circuit is connected to the towing harness connector to receive power to charge the battery.

20. The system of claim 19, wherein the main controller further comprises an RF subsystem configured for wireless communication with external components.

\* \* \* \* \*